US011168771B2

(12) United States Patent
Tsuchiya et al.

(10) Patent No.: US 11,168,771 B2
(45) Date of Patent: Nov. 9, 2021

(54) DRIVE FORCE TRANSMISSION DEVICE

(71) Applicant: KABUSHIKI KAISHA TOYOTA CHUO KENKYUSHO, Nagakute (JP)

(72) Inventors: Eiji Tsuchiya, Nagakute (JP);
Yoshihiro Mizuno, Nagakute (JP);
Norio Yonezawa, Nagakute (JP)

(73) Assignee: KABUSHIKI KAISHA TOYOTA CHUO KENKYUSHO, Nagakute (JP)

( * ) Notice: Subject to any disclaimer, the term of this patent is extended or adjusted under 35 U.S.C. 154(b) by 1048 days.

(21) Appl. No.: 15/695,581

(22) Filed: Sep. 5, 2017

(65) Prior Publication Data
US 2018/0066739 A1    Mar. 8, 2018

(30) Foreign Application Priority Data
Sep. 5, 2016   (JP) .............................. JP2016-172552

(51) Int. Cl.
| *F16H 33/02* | (2006.01) |
| *F16H 29/16* | (2006.01) |
| *F16H 29/14* | (2006.01) |
| *H02K 49/10* | (2006.01) |
| *F16H 29/12* | (2006.01) |

(52) U.S. Cl.
CPC ............. *F16H 29/16* (2013.01); *F16H 29/14* (2013.01); *F16H 33/02* (2013.01); *H02K 49/106* (2013.01); *F16H 29/12* (2013.01)

(58) Field of Classification Search
CPC .................................. F16H 33/02; F16H 33/06
USPC ............................................................. 74/63
See application file for complete search history.

(56) References Cited

U.S. PATENT DOCUMENTS

| 3,572,143 A | * | 3/1971 | Riemsdijk ................. H01H 3/40 74/116 |
| 5,131,355 A | * | 7/1992 | Bukovics ................ F02B 75/22 123/192.2 |
| 6,000,298 A | * | 12/1999 | Kato ....................... F16H 33/02 100/282 |
| 6,009,773 A | * | 1/2000 | Kato ....................... F16H 33/02 74/569 |

(Continued)

FOREIGN PATENT DOCUMENTS

| FR | 968699 | * | 12/1950 |
| GB | 197642 | * | 6/1924 |

(Continued)

OTHER PUBLICATIONS

Oct. 23, 2018 Office Action issued in Japanese Patent Application No. 2016-172552.

*Primary Examiner* — William C Joyce
(74) *Attorney, Agent, or Firm* — Oliff PLC

(57) ABSTRACT

To provide a drive force transmission device that is capable of transmitting elastic energy of an elastic member to an output shaft with a simpler structure than the structure of the related art. A drive force transmission device includes a first shaft (input shaft), and a second shaft (a crankshaft, a crank disc, an intermediate shaft). A force is applied to the second shaft in a predetermined direction of rotation and in a direction opposite to the direction of rotation. The force varies in strength in association with the rotation. The first shaft is connected to the second shaft, and transmission of a drive force of the first shaft to the second shaft is enabled.

7 Claims, 32 Drawing Sheets

(56) References Cited

U.S. PATENT DOCUMENTS

| | | | |
|---|---|---|---|
| 8,701,615 B2* | 4/2014 | Towne, III | F16H 53/025 |
| | | | 123/192.1 |
| 10,401,259 B2* | 9/2019 | Ogata | B60K 6/36 |
| 2017/0009860 A1 | 1/2017 | Tsuchiya et al. | |
| 2018/0180514 A1* | 6/2018 | Ogata | G01M 13/02 |
| 2018/0231096 A1 | 8/2018 | Tsuchiya et al. | |

FOREIGN PATENT DOCUMENTS

| | | |
|---|---|---|
| JP | S49-117870 A | 11/1974 |
| JP | H10-018958 A | 1/1998 |
| JP | 2013-053649 A | 3/2013 |
| JP | 2015-135179 A | 7/2015 |
| JP | 2016-156408 A | 9/2016 |

\* cited by examiner

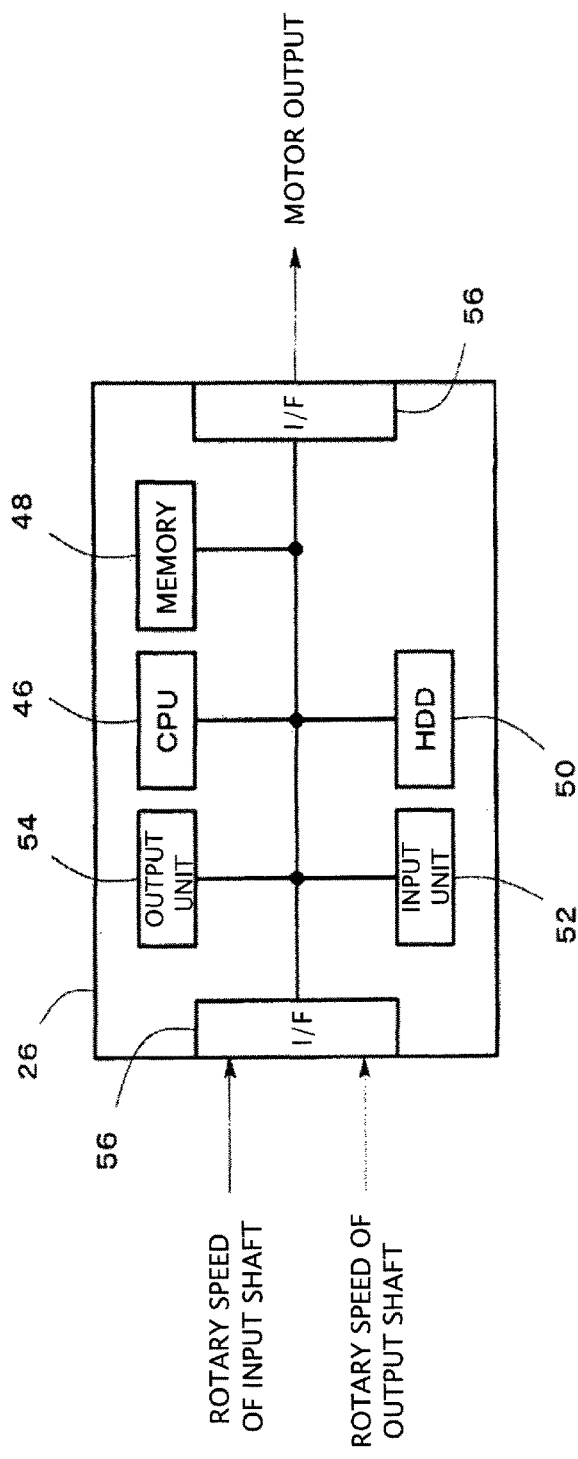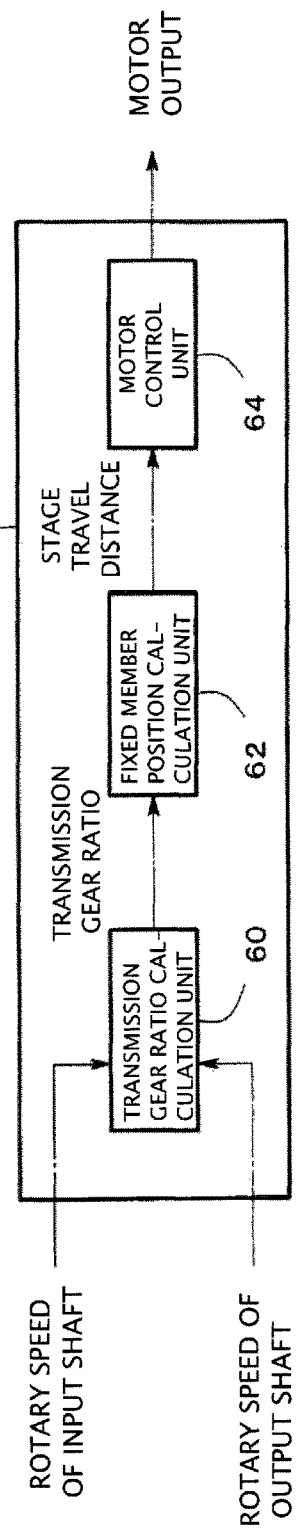

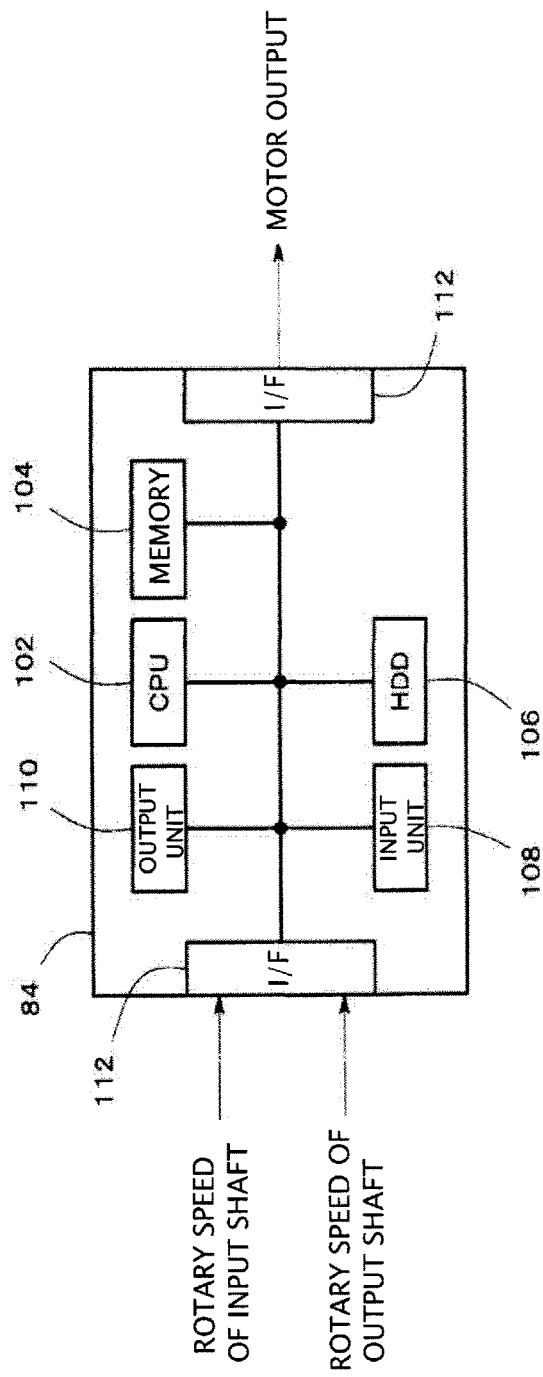
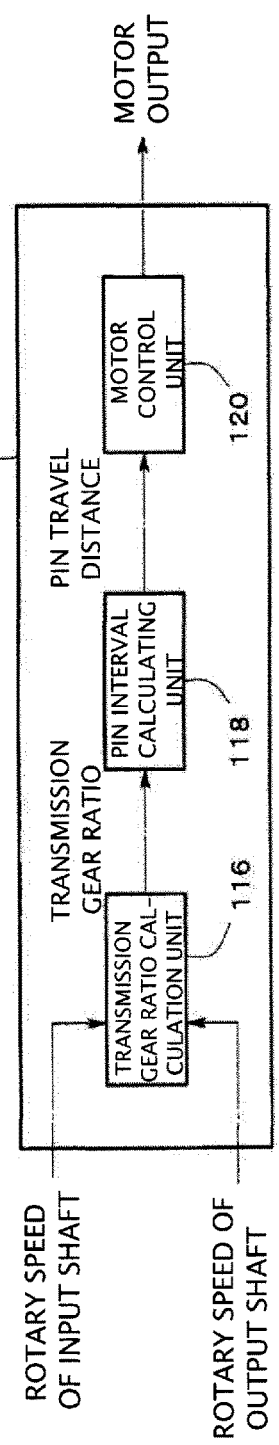
FIG. 17A
FIG. 17B

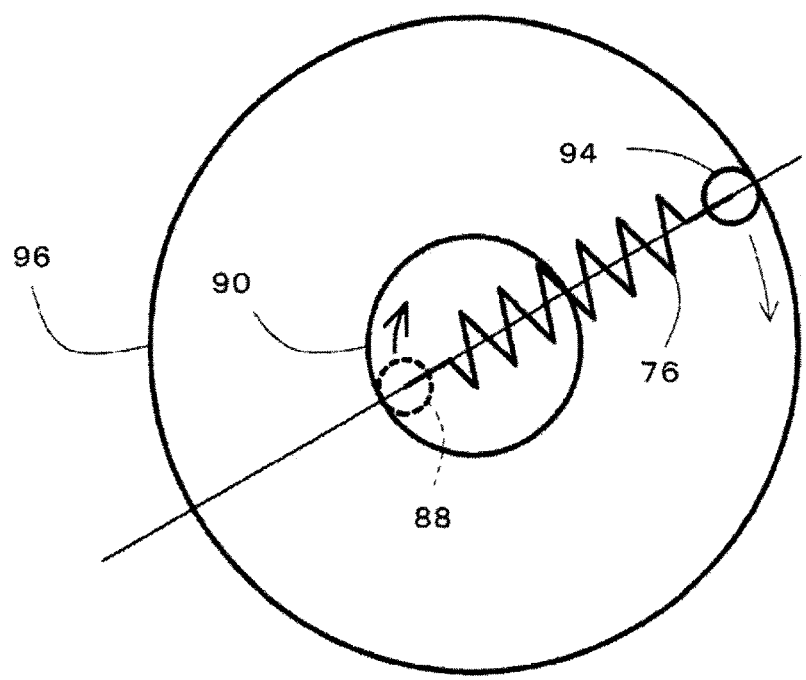
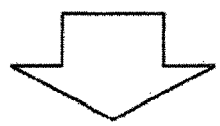
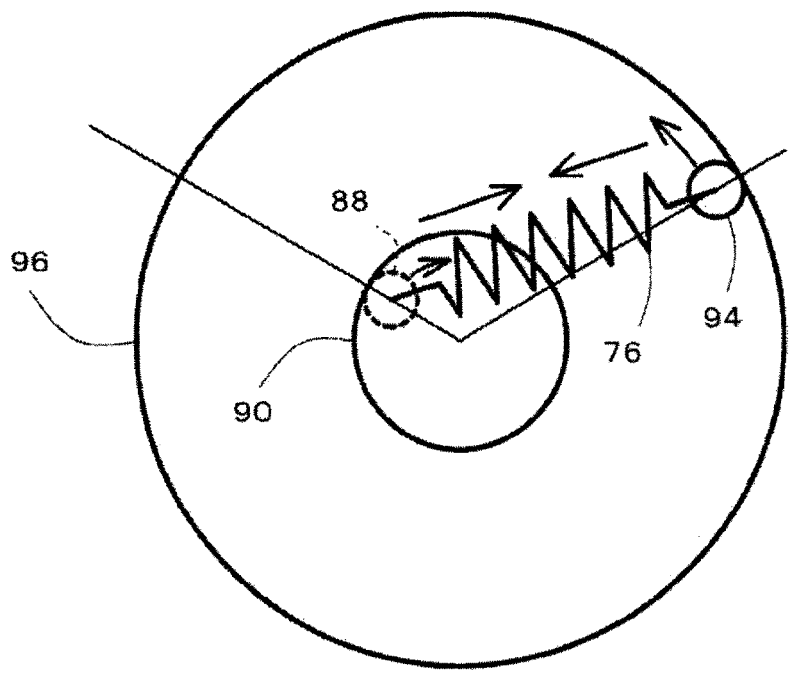
FIG. 21

DRIVE FORCE TRANSMISSION DEVICE

CROSS REFERENCE TO RELATED APPLICATION

This application claims priority to Japanese Patent Application No. 2016-172552 filed on Sep. 5, 2016, which is incorporated herein by reference in its entirety.

TECHNICAL FIELD

The present disclosure relates to a so-called pulse drive type drive force transmission device configured to transmit a drive force of an input shaft intermittently to an output shaft.

BACKGROUND

In the related art, a drive force transmission device configured to transmit a drive force of an input shaft intermittently to an output shaft by changing angular speed and torque is used. For example, JP 2015-135179 A discloses a so-called pulse drive type drive force transmission device.

In the transmission device described above, an elastic member is disposed on a circumference of an output shaft. One end of the elastic member is coupled to the output shaft, and an oscillator which serves as a weight (mass) is coupled to the other end thereof. The oscillator moves (oscillates) freely around the circumference of the output shaft in association with expansion and contraction of the elastic member. At a predetermined time, for example, at a time when angular speed of the oscillator matches a rotary speed of the input shaft, the oscillator is engaged with the input shaft by a clutch device such as an electromagnetic clutch or a one-way clutch. During the period of this engagement, the elastic member is expanded (or contracted) to accumulate elastic energy. The oscillator which is disengaged from the input shaft later moves (oscillates) freely, and then at a predetermined time, for example, at a time when the angular speed of the oscillator becomes zero, the oscillator is fixed by a braking device such as an electromagnetic brake. At this time, the elastic member biases the output shaft, so that torque is transmitted to the output shaft. In this manner, the torque is transmitted from the input shaft to the output shaft via elastic energy.

JP 10-18958 A and JP 2013-53649 A disclose a drive mechanism including a crankshaft connected to an electric motor and a spring that expands and contracts in association with the rotation of the crankshaft.

The pulse drive type drive force transmission device of the related art needs to control braking of an oscillator when transmitting elastic energy of the elastic member to the output shaft, and a braking device is necessary such as a brake control circuit or a brake control program. Accordingly, it is an object of the present disclosure to provide a drive force transmission device that is capable of transmitting elastic energy of an elastic member to an output shaft in a simpler structure than the structure of the related art.

SUMMARY

The disclosure relates to a drive force transmission device. The apparatus includes a first shaft and a second shaft. A force in a predetermined direction of rotation or in a direction opposite to the direction of rotation is applied to the second shaft. The force varies in strength in association with the rotation. The first shaft and the second shaft are connected. In this configuration, a drive force of the first shaft may be transmitted to the second shaft.

In the disclosure described above, a control unit and a demand value acquiring unit may be provided. In this case, the control unit may control a range of the force applied to the second shaft based on a demand value acquired by the demand value acquiring unit.

In the disclosure described above, an elastic member may be provided. In this case, a configuration in which the first shaft and the second shaft are connected, one end of the elastic member is connected to a periphery of the second shaft, and the other end of the elastic member is fixed to a fixed member, is also applicable.

In the disclosure described above, the second shaft may be a crankshaft. In this case, a configuration in which a main journal of the crankshaft is connected coaxially with the first shaft, and one end of the elastic member is slidably connected to a crank pin of the crankshaft, is applicable.

In the disclosure described above, the first shaft and the second shaft may be connected via a first one-way clutch. In this case, the first one-way clutch may enter an engaged state when the rotary speed of the second shaft is equal to or lower than that of the first shaft and enter a disengaged state when the rotary speed of the second shaft is higher than that of the first shaft.

In the disclosure described above, a third shaft to be connected to the second shaft may be provided. In this case, a configuration in which the third shaft is connected to the second shaft via a second one-way clutch, and the second one-way clutch enters a disengaged state when the rotary speed of the second shaft is lower than that of the third shaft and an engaged state when the rotary speed of the second shaft is equal to or higher than that of the third shaft, is also applicable.

In the disclosure described above, the rotary speed of the first shaft may be lower than that of the third shaft.

In the disclosure described above, a configuration in which the second shaft is rotated in association with the rotation of the first shaft by the first one-way clutch entering the engaged state when the rotary speed of the second shaft is equal to or lower than that of the first shaft, and the elastic member is expanded in association with the rotation of the second shaft thereby accumulating elastic energy, is also applicable. In this case, when the crank pin rotates further from the uppermost point where the fixed member and the crank pin are at positions farthest from each other and the elastic member is expanded to the maximum, the second shaft is rotated in association with contraction of the elastic member, and when the rotary speed of the second shaft in association with the contraction exceeds the rotary speed of the first shaft, the first one-way clutch is moved from the engaged state to the disengaged state. When the rotary speed of the second shaft in association with the contraction of the elastic member reaches a speed equal to the rotary speed of the third shaft, the second one-way clutch enters the engaged state and the third shaft is biased.

In the disclosure described above, the control unit may control spring stiffness of the elastic member based on the demand value acquired by the demand value acquiring unit.

In the disclosure described above, the control device may include a movable mechanism that may change a relative distance between the fixed member and the crank pin. In this case, the control unit may control driving of the movable mechanism based on the demand value, which corresponds to a transmission gear ratio of the third shaft with respect to the first shaft acquired by the demand value acquiring unit.

In the disclosure described above, an elastic member may be provided. In this case, an end of the elastic member may be connected to a circumference of the first shaft and the other end of the elastic member may be connected to a circumference of the second shaft.

In the disclosure described above, both of the first shaft and the second shaft may be provided with a main shaft which rotates coaxially and an off-axis pin offset from the main shaft. In this case, an end of the elastic member may be connected to the off-axis pin of the first shaft and the other end of the elastic member may be connected to the off-axis pin of the second shaft.

In the disclosure described above, a third shaft to be connected to the second shaft may be provided. In this case, the second shaft may be allowed to rotate only in one direction with respect to the third shaft.

In the disclosure described above, a backstop mechanism fixed to the second shaft that enters a disengaged state when the second shaft rotates in the same direction as the third shaft, and enters an engaged state when the second shaft rotates in a direction opposite to the third shaft, may be provided.

In the disclosure described above, the second shaft and the third shaft may be connected via a one-way clutch. In this case, a configuration in which the one-way clutch enters a disengaged state when the rotary speed of the second shaft is lower than that of the third shaft, and enters an engaged state when the rotary speed of the second shaft is equal to or higher than that of the third shaft, is also applicable.

In the disclosure described above, the rotary speed of the first shaft may exceed that of the third shaft.

In the disclosure described above, based on a rotary speed difference between the first shaft and the second shaft engaged with the third shaft via the one-way clutch, the elastic member may be expanded to accumulate elastic energy and a drive force may be transmitted from the first shaft to the second shaft, and to the third shaft via the elastic member. In this case, when a relative phase difference between the off-axis pin of the first shaft and the off-axis pin of the second shaft reaches 180° or higher, the backstop mechanism enters the engaged state so as to stop the second shaft biased in a direction opposite to the direction of rotation in association with the contraction of the elastic member. In addition, the first shaft rotates in a period during which the backstop mechanism is entering the engaged state to bring the relative phase difference between the off-axis pin of the first shaft and the off-axis pin of the second shaft to 0°.

In the disclosure described above, the directions of rotation of the first shaft and the third shaft may be opposite from each other.

In the disclosure described above, a configuration in which the backstop mechanism enters the engaged state to stop the second shaft biased from the first shaft in a direction opposite from the third shaft via the elastic member, is also applicable. In this case, the first shaft rotates and thus the elastic member is expanded to accumulate elastic energy in a period during which the backstop mechanism is entering the engaged state. In addition, when the relative phase difference between the off-axis pin of the first shaft and the off-axis pin of the second shaft reaches 180° or higher, the backstop mechanism enters the disengaged state with respect to the second shaft biased in the same direction of rotation as the third shaft in association with the contraction of the elastic member. In addition, when the rotary speed of the second shaft reaches the same speed as the third shaft, the one-way clutch enters the engaged state, and the third shaft is biased.

In the disclosure described above, the control unit may be configured to control spring stiffness of the elastic member based on the demand value acquired by the demand value acquiring unit.

In the disclosure described above, the control device may include a movable mechanism that may change a relative distance between the off-axis pin of the first shaft and the off-axis pin of the second shaft. In this case, the control unit may control driving of the movable mechanism based on the demand value, which corresponds to a transmission gear ratio of the third shaft with respect to the first shaft acquired by the demand value acquiring unit.

In the disclosure described above, a first magnet and a second magnet may be provided. In this case, a configuration in which the first shaft and the second shaft are connected, the first magnet is provided on the circumference of the second shaft and the second magnet is provided on the fixed member, is also applicable. In addition, the first magnet may be disposed so as to be repulsive to the second magnet.

In the disclosure described above, a first magnet and a second magnet may be provided. In this case, the first magnet may be provided on the circumference of the first shaft, the second magnet is provided on the circumference of the second shaft, and the first magnet may be disposed so as to be repulsive to the second magnet.

In the disclosure described above, the control unit may control a magnetic force of the first magnet or the second magnet based on the demand value acquired by the demand value acquiring unit.

According to the disclosure, when transmitting the elastic energy of the elastic member to the output shaft, a control device such as a brake control circuit of the brake is not necessary. Therefore, a drive force transmission device having a structure simpler than that of the related art may be provided.

BRIEF DESCRIPTION OF DRAWINGS

Embodiment(s) of the present disclosure will be described based on the following figures, wherein:

FIG. 2A is a drawing illustrating a hardware configuration of a control apparatus;

FIG. 2B is a drawing illustrating a functional block of the control apparatus;

FIG. 17A is a drawing illustrating a hardware configuration of a control apparatus;

FIG. 17B is a drawing illustrating a functional block of the control apparatus;

FIG. 21 is an explanatory drawing illustrating an action when the phase difference exceeds 180°;

DESCRIPTION OF EMBODIMENTS

First Embodiment

Figure 1:
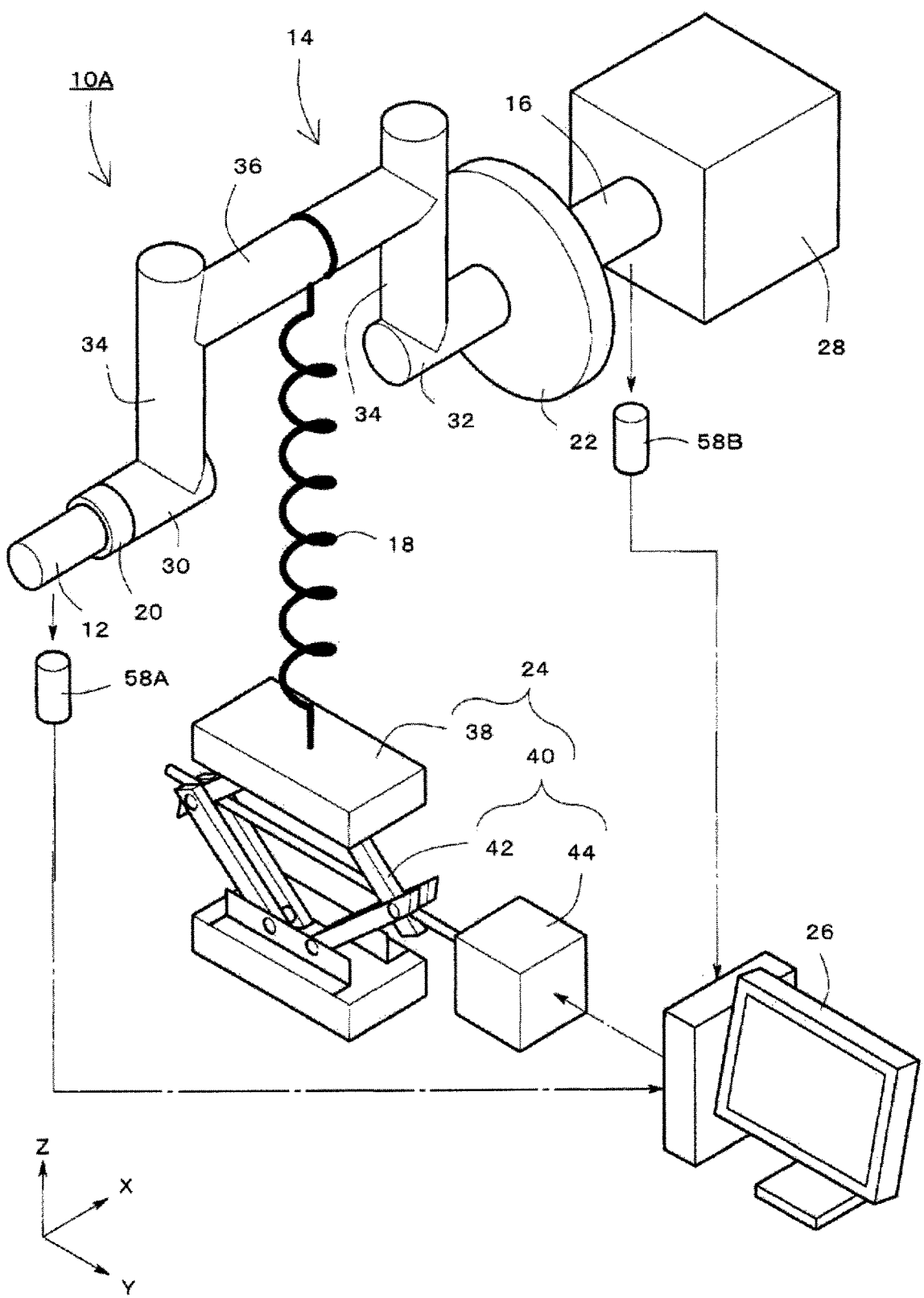
FIG. 1 is a perspective view illustrating a drive force transmission device according to a first embodiment.

FIG. 1 illustrates a drive force transmission device 10A according to a first embodiment. The drive force transmission device 10A includes an input shaft 12 (first shaft), a crankshaft 14 (second shaft), an output shaft 16 (third shaft), an elastic member 18, a one-way clutch 20 (first one-way clutch), a weight 22, a stage unit 24, and a control apparatus 26.

In order to simplify the illustration, bearings or the like that rotatably support a first shaft, a second shaft, and a third shaft are omitted as needed in any of embodiments.

The drive force transmission device 10A transmits a drive force to the output shaft 16 from the input shaft 12 via the crankshaft 14 (and the elastic member 18 connected thereto). In addition, the drive force is transmitted to a load 28 connected to the output shaft 16.

The input shaft 12 (first shaft) is driven to rotate by a drive source, not illustrated. The one-way clutch 20 is provided between the input shaft 12 and the crankshaft 14 and connects between the two. The one-way clutch 20 includes, for example, an over running clutch. For example, one of an input-side main journal 30 and the input shaft 12 of the crankshaft 14 is fixedly connected to an inner race of the one-way clutch 20, and the other one is fixedly connected to an outer race of the one-way clutch 20.

An engaging mechanism is configured in such a manner that the one-way clutch 20 enters an engaged state (meshed state) when a rotary speed $R_{MID}$ of the crankshaft 14 is equal to or lower than a rotary speed $R_{IN}$ of the input shaft 12 ($R_{IN} \geq R_{MID}$), and enters a disengaged state (idling state) when the rotary speed $R_{MID}$ of the crankshaft 14 exceeds the rotary speed $R_{IN}$ of the input shaft 12 ($R_{IN} < R_{MID}$). In the engaged state, the drive force of the input shaft 12 is transmitted to the crankshaft 14. In the disengaged state, the transmission of the drive force from the input shaft 12 to the crankshaft 14 is cut off.

As will be described later, a force from the elastic member 18, a shaft-side magnet 124, and a fixed-side magnet 128 is applied to the crankshaft 14 (second shaft) in a predetermined direction of rotation and in a direction opposite to the predetermined direction of rotation. A strength of the force varies with the rotation. For example, when the elastic member 18 is expanded, a force that works against the expanding action is applied to the crankshaft 14, and when the elastic member 18 proceeds beyond the uppermost point where the elastic member 18 is expanded to the maximum, the crankshaft 14 is biased to rotate by a contraction force of the elastic member 18.

The crankshaft 14 includes the input-side main journal 30, an output-side main journal 32, crank arms 34, and a crank pin 36. The input-side main journal 30 and the output-side main journal 32 are main shaft members of the crankshaft 14, and are both provided coaxially with the input shaft 12 (first shaft). The crank pin 36 is disposed at a position offset from the axes of the input-side main journal 30 and the output-side main journal 32, that is, disposed radially outside, and rotates about the axis of the input shaft 12. The input-side main journal 30, the output-side main journal 32, and the crank pin 36 are connected by the crank arms 34.

The elastic member 18 is connected at one end thereof to the crank pin 36. For example, a connecting end of the elastic member 18 is formed into a ring shape, and is slidably wound around an outer periphery of the crank pin 36 (second shaft). The other end of the elastic member 18 is fixed to a fixed member 38 (stage plate) of the stage unit 24. The elastic member 18 includes, for example, a spring member such as a helical spring.

The weight 22 is fixedly connected to a terminal end portion of the output-side main journal 32 of the crankshaft 14. The weight 22 is a mass portion having a function of an oscillator or a rotor. In addition, the weight 22 is fixedly connected to the output shaft 16.

The output shaft 16 (third shaft) is disposed coaxially with the input shaft 12 (first shaft) as well as the input-side main journal 30 and the output-side main journal 32 of the crankshaft 14 (second shaft). As described above, the weight 22 is fixedly connected to an axial end (input side) of the output shaft 16, and the other end opposed thereto is fixedly connected to the load 28.

The stage unit 24 includes the fixed member 38 and a movable mechanism 40. One end of the elastic member 18 is connected to the fixed member 38 (stage plate). The movable mechanism 40 is configured to change a relative distance between the crank pin 36 and the fixed member 38. For example, the stage unit 24 may be a Z stage, and the movable mechanism 40 includes a Z lifter 42 and a motor 44. By controlling driving of the motor 44, the Z lifter 42 moves (moves upward and downward) the fixed member 38 along a vertical direction (Z-axis direction in FIG. 1).

In association with the movement of the fixed member 38, the elastic member 18 expands and contracts, and accordingly, spring stiffness of the elastic member 18 changes. As will be described later, a transmission gear ratio of the output shaft 16 (third shaft) with respect to the input shaft 12 (first shaft) may be followed by changing the spring stiffness.

The control apparatus 26 controls the stage unit 24 to adjust the spring stiffness of the elastic member 18. FIG. 2A illustrates a hardware configuration of the control apparatus 26, and FIG. 2B illustrates a functional block diagram of the control apparatus 26.

The control apparatus 26 includes, for example, a computer. As illustrated in the hardware configuration drawing in FIG. 2A, the control apparatus 26 includes a CPU 46 (Central Processing Unit), a memory 48, a hard disk drive 50 (HDD), an input unit 52 such as a keyboard or a mouse, and an output unit 54 which is a display device such as a display, and an I/O interface 56, and these members are respectively connected via system buses.

The hard disk drive 50 is a computer readable non-volatile storage medium in which programs for executing transmission gear control described later are memorized. By the program executed by the CPU 46, the computer that constitutes the control apparatus 26 functions as a respective functional parts (described later) illustrated in FIG. 2B.

The control apparatus 26 acquires a rotary speed $R_{IN}$ of the input shaft 12 (first shaft) from an input shaft rotary speed sensor 58A. The control apparatus 26 also acquires a rotary speed $R_{OUT}$ of the output shaft 16 (third shaft) from an output shaft rotary speed sensor 58B. Although illustration is omitted, a crankshaft rotary speed sensor that detects a rotary speed $R_{MID}$ (change) of the crankshaft 14 is provided for the control apparatus 26 to acquire the rotary speed $R_{MID}$.

The control apparatus 26 controls a range of spring stiffness of the elastic member 18, in other words, a force applied to the crankshaft 14 (second shaft), based on a transmission gear ratio (demand value) acquired from the rotary speed $R_{IN}$ of the input shaft 12 (first shaft) and the rotary speed $R_{OUT}$ of the output shaft 16 (third shaft). As illustrated in FIG. 2B, the control apparatus 26 includes a transmission gear ratio calculation unit 60 (demand value acquiring unit), a fixed member position calculation unit 62, and a motor control unit 64 (control unit).

The transmission gear ratio calculation unit 60 (demand value acquiring unit) acquires the rotary speed $R_{IN}$ of the input shaft 12 (first shaft) from the input shaft rotary speed sensor 58A and acquires the rotary speed $R_{OUT}$ of the output shaft 16 (third shaft) from the output shaft rotary speed sensor 58B. The transmission gear ratio calculation unit 60 acquires a transmission gear ratio $R_{OUT}/R_{IN}$ (demand value), which is a ratio of the rotary speed $R_{OUT}$ of the output shaft 16 (third shaft) with respect to the rotary speed $R_{IN}$ of the input shaft 12 (first shaft).

The transmission gear ratio is sent from the transmission gear ratio calculation unit 60 to the fixed member position calculation unit 62. The fixed member position calculation unit 62 memorizes a (current) transmission gear ratio set when receiving the transmission gear ratio, and the fixed member position calculation unit 62 calculates a difference between the current transmission gear ratio and the transmission gear ratio received from the transmission gear ratio calculation unit 60.

In the case where the difference described above is included in the predetermined threshold range, for example, in the case where the ratio between both ratios is 0.95 to 1.05 inclusive, it is determined that the spring stiffness does not have to change, and a stage travel distance of 0 is sent to the motor control unit 64. In contrast, in the case where the above-described difference exceeds the predetermined threshold range, the fixed member position calculation unit 62 calculates a stage travel distance based on the difference between the transmission gear ratios and sends the obtained value to the motor control unit 64.

In the motor control unit 64, a driving amount of the motor 44 of the stage unit 24 is calculated based on the stage travel distance. For example, a pulse signal of the motor 44 based on the stage travel distance is output to the motor 44.

In this manner, by changing the spring stiffness of the elastic member 18 based on a speed change of the input shaft 12 (first shaft) and the output shaft 16 (third shaft), in other words, by controlling the range of the force applied from the elastic member 18 to the crankshaft 14 (second shaft), the drive force may be transmitted smoothly from the input shaft 12 to the output shaft 16.

FIG. 3 to FIG. 6 schematically illustrate actions of the drive force transmission device 10A according to the embodiment (first embodiment). In FIG. 3 to FIG. 6, the one-way clutch 20 with hatching is in the engaged state and the one-way clutch 20 without hatching is in the disengaged state. Devices which are not closely related to the description of actions given here will not be illustrated here.

Figure 7:
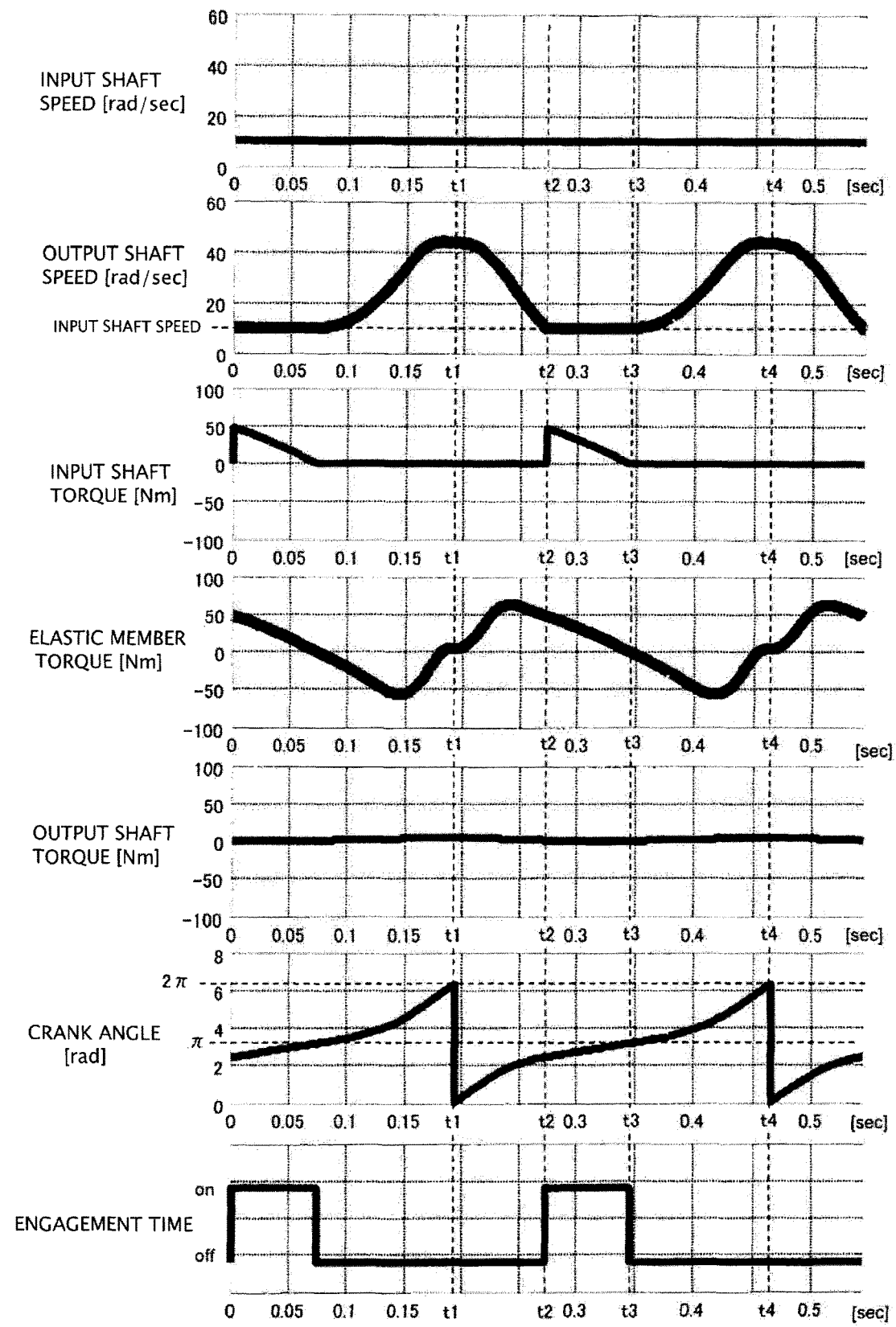
FIG. 7 is a drawing illustrating a timing chart of the drive force transmission device according to the first embodiment.

FIG. 7 illustrates a temporal change such as the speed change in association with driving of the drive force transmission device 10A. Specifically, in FIG. 7, speed (rotary speed) of input shaft 12 (first shaft), speed (rotary speed) of the output shaft 16 (third shaft), a torque change of the input shaft 12, a torque change of the elastic member 18, a torque change of the output shaft 16, an angle [rad] change of the crankshaft 14, and engagement timing of the one-way clutch 20 are shown from the top.

Figure 3:
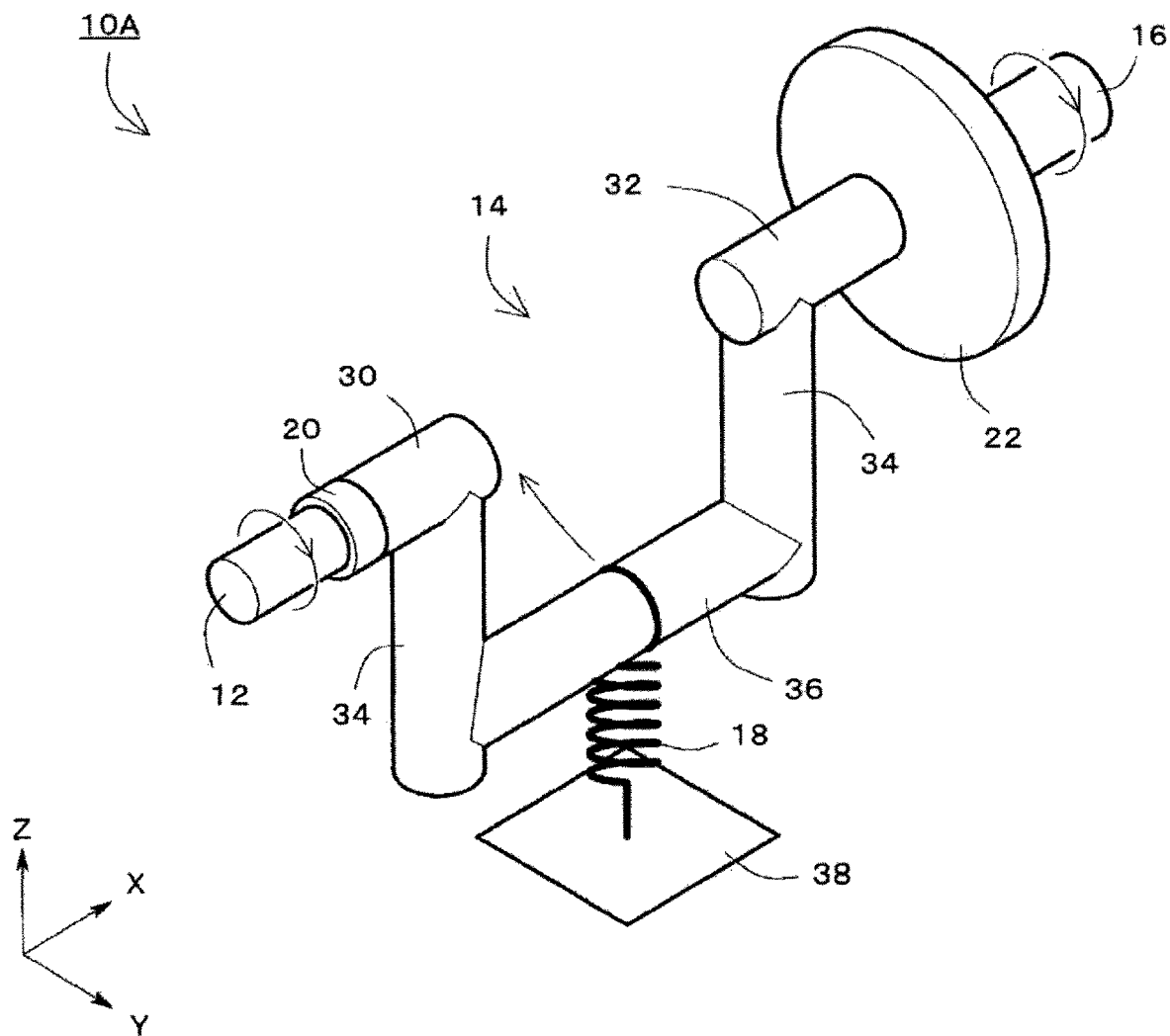
FIG. 3 is an explanatory drawing illustrating an action (crank phase=0°) of the drive force transmission device according to the first embodiment.
Figure 5:
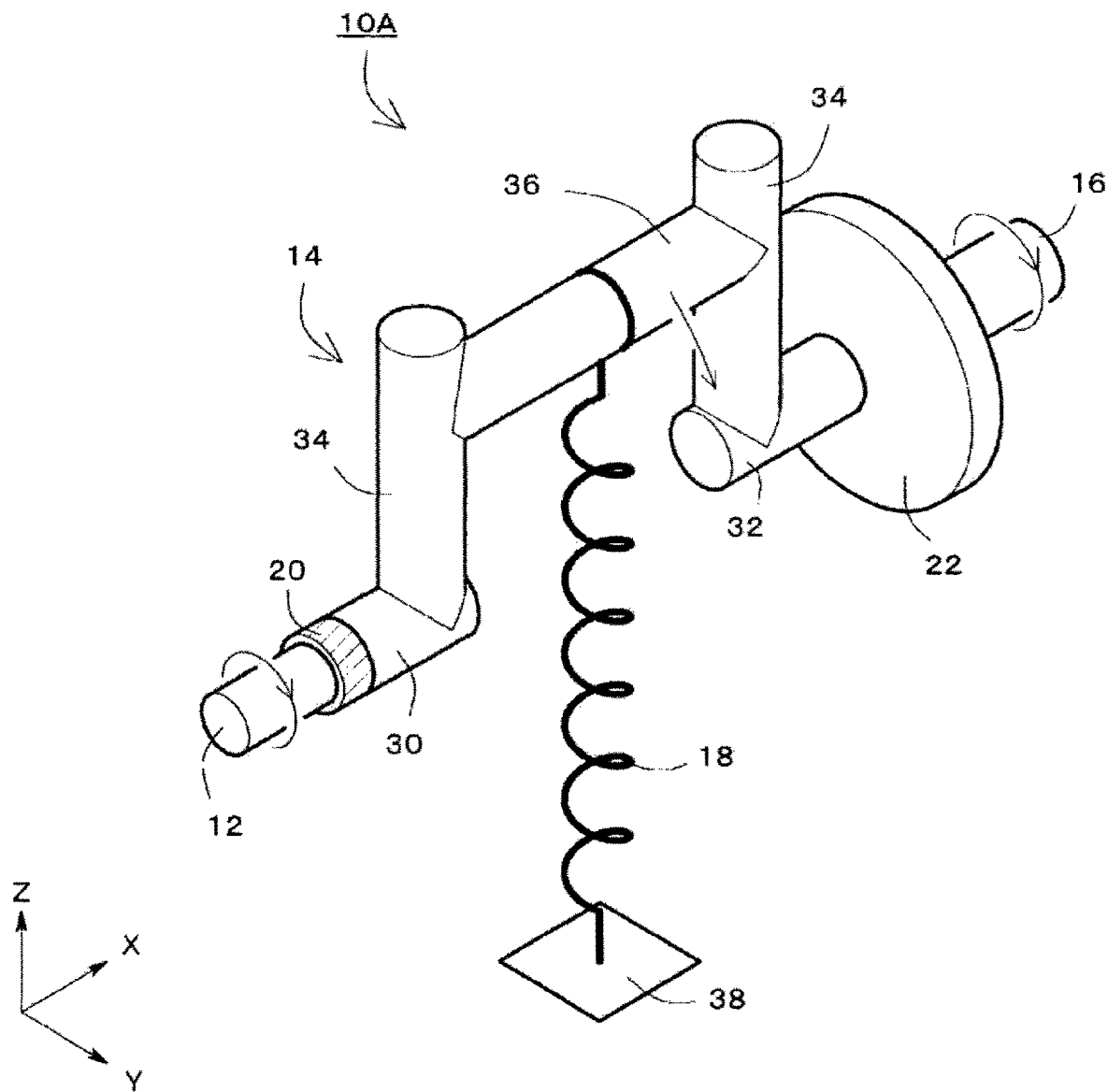
FIG. 5 is an explanatory drawing illustrating an action (crank phase=180°) of the drive force transmission device according to the first embodiment.

Regarding the angle of the crankshaft 14, an angular position at which the crank pin 36 is in closest proximity to the fixed member 38 as illustrated in FIG. 3 is assumed to be 0° (0[rad]) and an angular position at which the crank pin 36 is at the farthest distance from the fixed member 38 as illustrated in FIG. 5 is assumed to be 180° (π[rad]). OFF in the graph for the time of engagement indicates the disengaged state (idling state), and ON in the same graph indicates the engaged state (meshed state).

In this embodiment, as will be seen in a comparison between the input shaft speed and the output shaft speed in FIG. 7, transmission of the drive force in so-called acceleration drive, in which the output shaft speed is equal to or higher than the input shaft speed, is performed.

At time t1 of the output shaft speed in FIG. 7, the phase of the crankshaft 14 becomes 0°, and subsequently, at time t2, the output shaft 16 (third shaft) reaches a speed equal to the input shaft 12 (first shaft) (the reason that the speeds become equal will be described later). The crankshaft 14 (second shaft) fixedly connected to the output shaft 16 also reaches the speed equal to the input shaft 12. At this time, the one-way clutch 20 is switched from the disengaged state to the engaged state, and the crankshaft 14 is biased in the same direction of rotation as the input shaft 12 by the input shaft 12.

Figure 4:
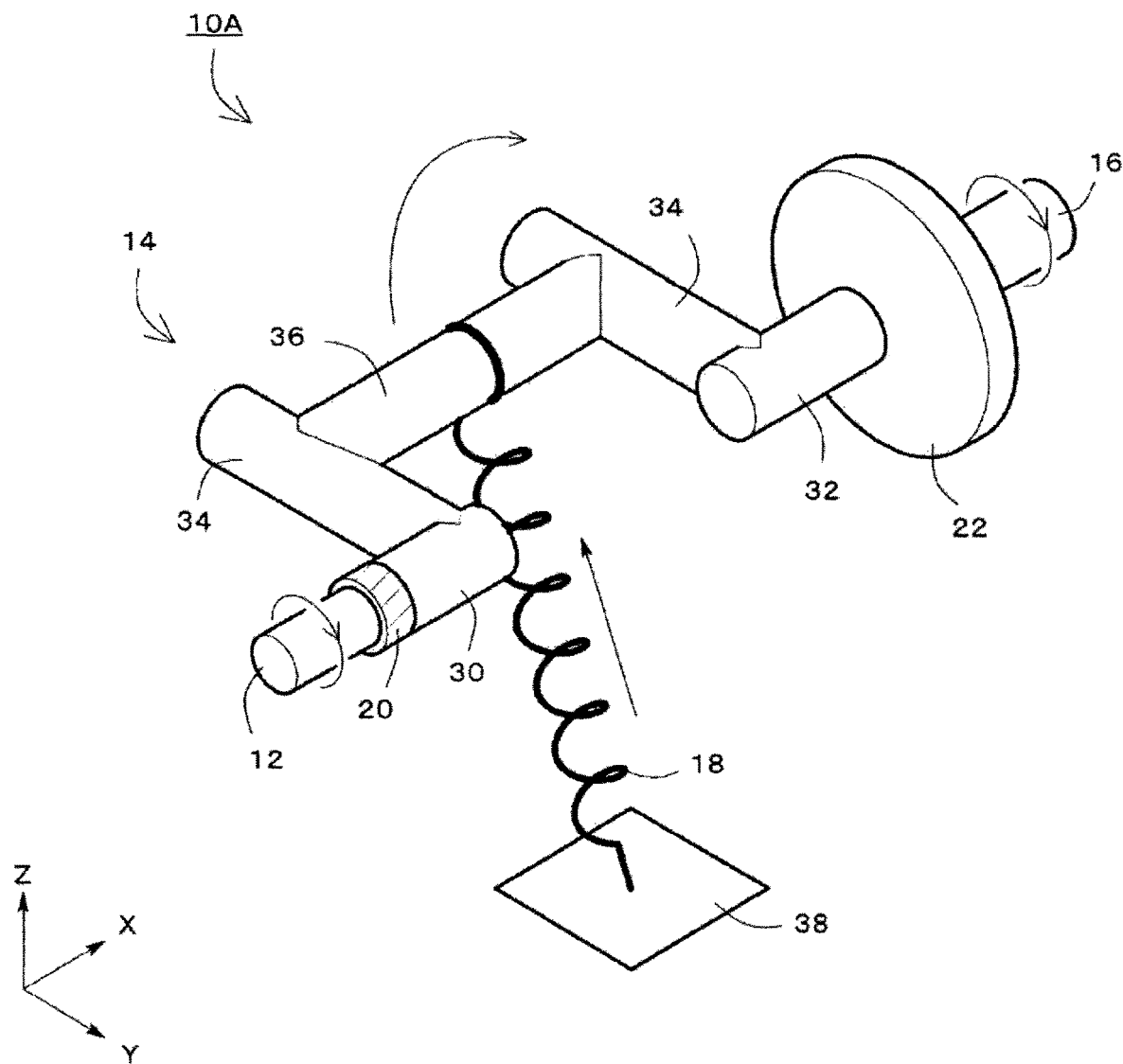
FIG. 4 is an explanatory drawing illustrating an action (crank phase=90°) of the drive force transmission device according to the first embodiment.
Figure 6:
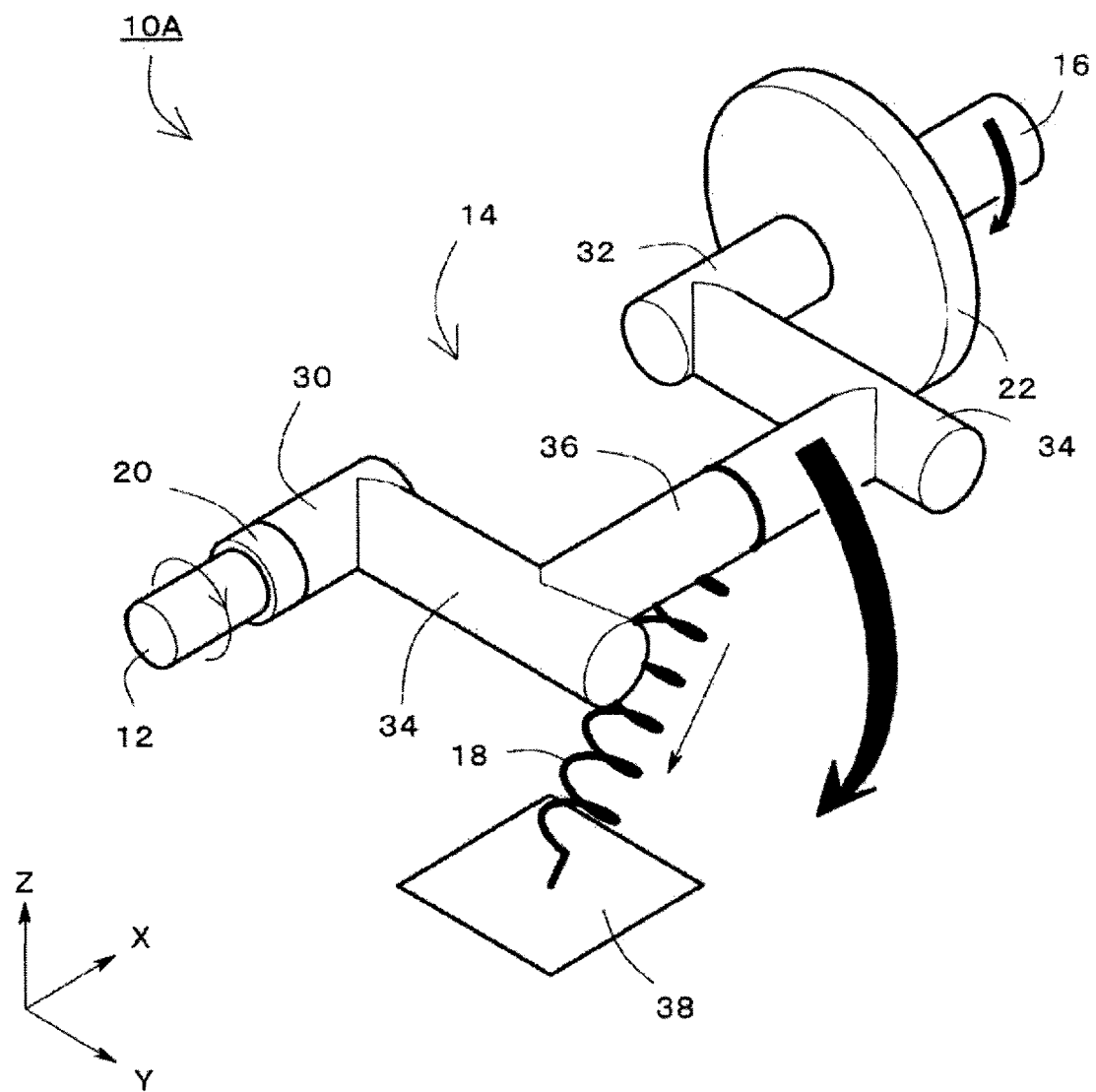
FIG. 6 is an explanatory drawing illustrating an action (crank phase=270°) of the drive force transmission device according to the first embodiment.

In association with the rotation of the crankshaft 14, the elastic member 18 is expanded and elastic energy is accumulated (energy accumulation) as illustrated in FIG. 4 to FIG. 5. As illustrated in FIG. 5, when the crank pin 36 is moved to a position farthest from the fixed member 38, and passes beyond an angle of 180° (π), that is, the uppermost point at which the elastic member 18 is expanded to the maximum, the elastic member 18 starts to contract. As illustrated in FIG. 6, the elastic member 18 is biased to rotate the crankshaft 14 in the course of the contraction (energy discharge).

As seen at time t3 in FIG. 7, the rotary speeds $R_{MID}$ of the crankshaft 14 and the output shaft 16 exceed the rotary speed $R_{IN}$ of the input shaft 12, and the one-way clutch 20 switches from the engaged state to the disengaged state.

From time t3 onward, the rotary speed of the output shaft 16 is changed in a shape like a mountain by the biasing of the elastic member 18. When the angle of the elastic member 18 is 0° (2π, time t4), the output shaft 16 reaches the maximum speed, and is then gradually reduced. When the output shaft 16 reaches a speed equal to that of the input shaft 12, the one-way clutch 20 switches from the disengaged state to the engaged state again. From then onward, the actions in FIG. 3 to FIG. 6 are repeated in sequence.

In this manner, according to this embodiment, as disengagement/engagement of the one-way clutch 20 is mechanically switched in accordance with the expansion and contraction of the elastic member 18, a brake control circuit that breaks the crankshaft 14 or the like in the energy accumulation process and the energy discharging process of the elastic member 18, and a computing device such as a program, do not have to be provided.

Second Embodiment

Figure 8:
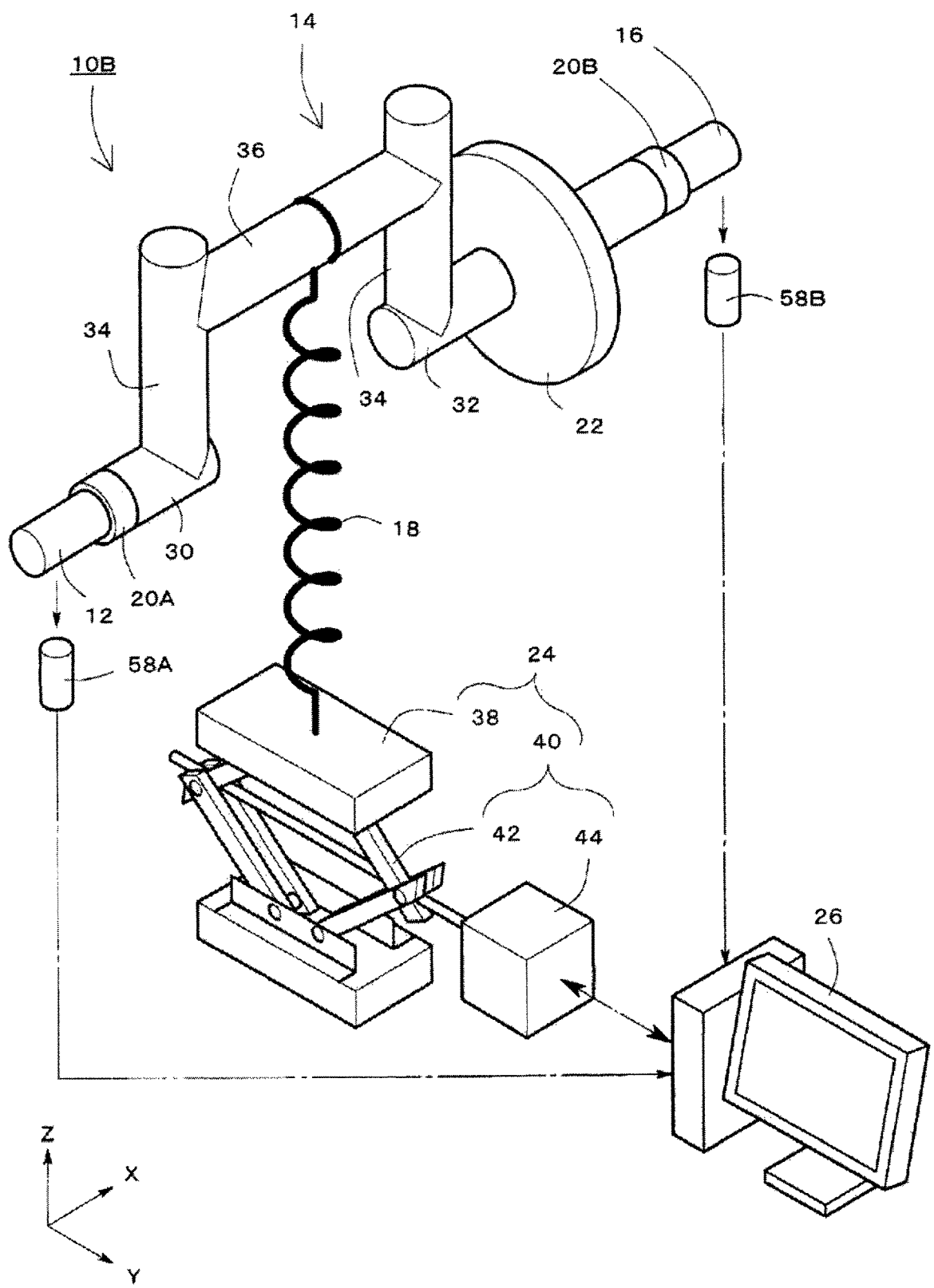
FIG. 8 is a perspective view illustrating a drive force transmission device according to a second embodiment.
Figure 9:
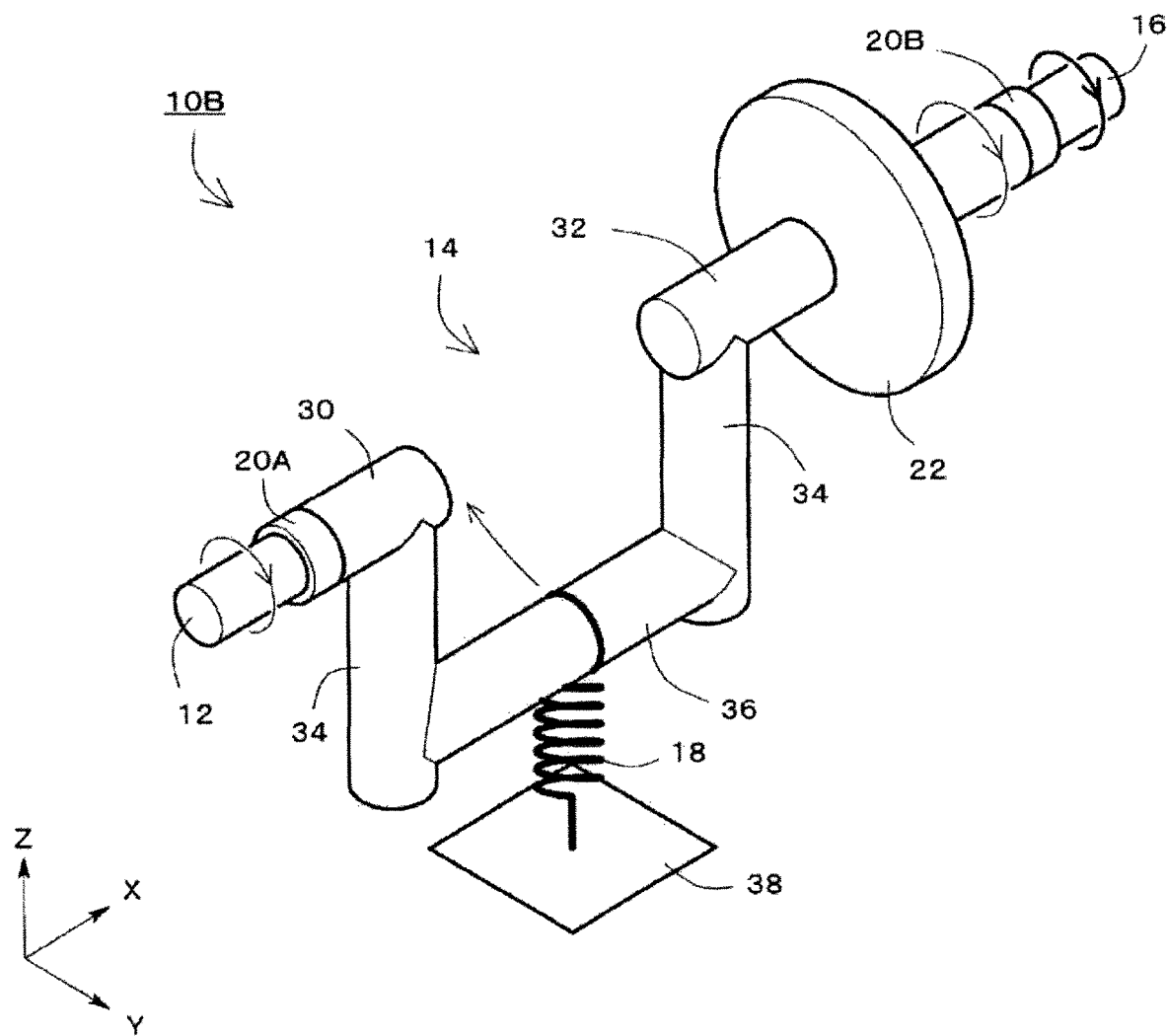
FIG. 9 is an explanatory drawing illustrating an action (crank phase=0°) of the drive force transmission device according to the second embodiment.

FIG. 8 illustrates a drive force transmission device 10B according to a second embodiment. A different point from the embodiment illustrated in FIG. 1 is that the input shaft 12 (first shaft) and the crankshaft 14 (second shaft) are connected via the one-way clutch 20 and, in addition, the crankshaft 14 (second shaft) and the output shaft 16 (third shaft) are also connected via the one-way clutch 20. In the description given below, the one-way clutch 20 on an input side is referred to as an input-side one-way clutch 20A (first one-way clutch), and the one-way clutch 20 on an output side is referred to as an output-side one-way clutch 20B (second one-way clutch).

Another difference from the embodiment illustrated in FIG. 1 is that the weight 22 is provided so as to penetrate through the output-side main journal 32 of the crankshaft 14. For example, the weight 22 has a disc shape having a central opening, and the output-side main journal 32 is inserted into the opening to be fixedly fitted. In addition, the terminal end of the output-side main journal 32 is connected to the output-side one-way clutch 20B.

The input-side one-way clutch 20A and the output-side one-way clutch 20B each include an over running clutch in the same manner as the one-way clutch 20 of the first embodiment. For example, one of the input-side main journal 30 and the input shaft 12 of the crankshaft 14 is fixedly connected to an inner race of the input-side one-way clutch 20A, and the other one is fixedly connected to an outer race of the input-side one-way clutch 20A. In the same manner, one of the output-side main journal 32 and the output shaft 16 of the crankshaft 14 is fixedly connected to an inner race of the output-side one-way clutch 20B, and the other one is fixedly connected to an outer race of the output-side one-way clutch 20B. The input shaft 12, the input-side main journal 30, and the output-side main journal 32, as well as the output shaft 16, are disposed coaxially.

An engaging mechanism is created in such a manner that the input-side one-way clutch 20A enters an engaged state (meshed state) when a rotary speed $R_{MID}$ of the crankshaft 14 (second axis) is equal to or lower than a rotary speed $R_{IN}$ of the input shaft 12 (first shaft) ($R_{IN} \geq R_{MID}$), and enters a disengaged state (idling state) when the rotary speed $R_{MID}$ of the crankshaft 14 exceeds the rotary speed $R_{IN}$ of the input shaft 12 ($R_{IN} < R_{MID}$). For example, meshing directions of engaging members such as sprag, a roller, and the like between the outer race and the inner race are set so as to be adapted both to the engaged state and the disengaged state.

The engaging mechanism (the meshing direction of the engaging members and the like) is created so that the output-side one-way clutch 20B enters the disengaged state (idling state) when the rotary speed $R_{MID}$ of the crankshaft 14 (second shaft) is lower than the rotary speed $R_{OUT}$ of the output shaft 16 (third shaft) ($R_{MID} < R_{OUT}$), and enters the engaged state (meshed state) when the rotary speed $R_{MID}$ of the crankshaft 14 is equal to or higher than the rotary speed $R_{OUT}$ of the output shaft 16 ($R_{MID} \geq R_{OUT}$).

Note that in order to avoid the input-side one-way clutch 20A and the output-side one-way clutch 20B entering the engaged state at the same time, the rotary speed $R_{IN}$ of the input shaft 12 (first shaft) is set to be lower than the rotary speed $R_{OUT}$ of the output shaft 16 (third shaft) ($R_{IN} < R_{OUT}$). As described above, the input-side one-way clutch 20A enters the engaged state under the condition of $R_{MID} \leq R_{IN}$ (engagement condition 1), and the output-side one-way clutch 20B enters the engaged state under the condition of $R_{MID} \geq R_{OUT}$ (engagement condition 2). With the rotary speeds of the input shaft 12 and the output shaft 16 set to be $R_{IN} < R_{OUT}$ (speed increase condition), simultaneous establishment of the engagement conditions of the input-side one-way clutch 20A and the output-side one-way clutch 20B is avoided.

For example, when the engagement condition 1 and the acceleration condition are combined, $R_{MID} \leq R_{IN} < R_{OUT}$ is established, and the engagement condition 2 ($R_{MID} \geq R_{OUT}$) is not established. When the engagement condition 2 and the acceleration condition are combined, $R_{MID} \geq R_{OUT} > R_{IN}$ is established, and the engagement condition 1 ($R_{MID} \leq R_{IN}$) is not established. In this manner, the drive force transmission device 10B according to this embodiment (second embodiment) mainly performs so-called acceleration drive in order to avoid the simultaneous engagement of the input-side one-way clutch 20A and the output-side one-way clutch 20B.

Since the hardware configuration and the functional block diagram of the control apparatus 26 are the same as the embodiment illustrated in FIG. 2A and FIG. 2B, FIG. 2A and FIG. 2B are used for the description of the control apparatus 26 according to the second embodiment.

FIG. 9 to FIG. 12 schematically illustrate actions of the drive force transmission device 10B according to this embodiment. In FIG. 9 to FIG. 12, the input-side one-way clutch 20A and the output-side one-way clutch 20B with hatching are in the engaged state and those without hatching are in the disengaged state. Devices which are not closely related to the description of actions given here will not be illustrated.

Figure 13:
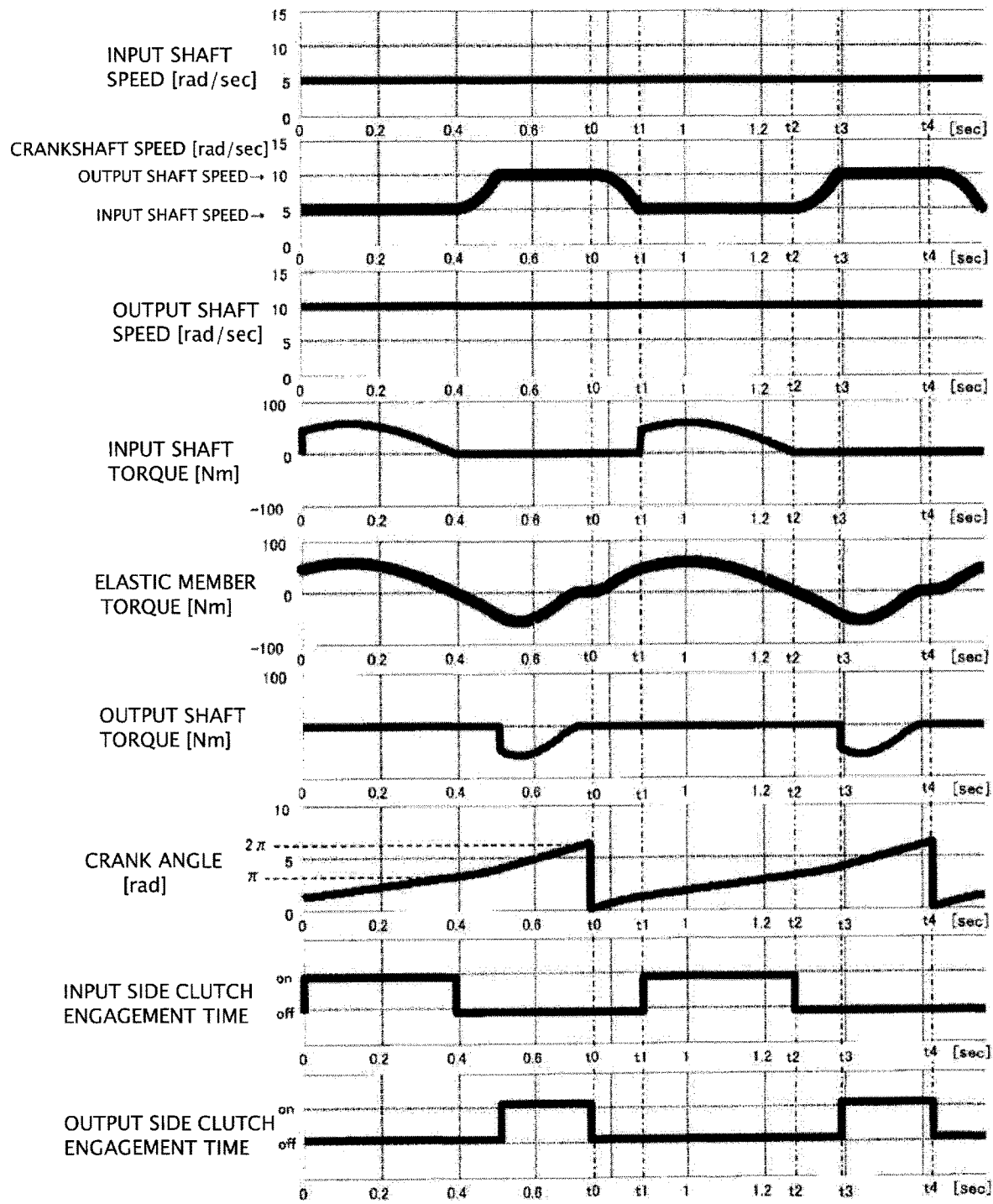
FIG. 13 is a drawing illustrating a timing chart (transmission gear ratio=2.0) of the drive force transmission device according to the second embodiment.

FIG. 13 illustrates a temporal change such as the speed change in association with driving of the drive force transmission device 10B. Specifically, in FIG. 13, speed (rotary speed) of input shaft 12 (first shaft), speed (rotary speed) of the crankshaft 14 (second shaft), speed (rotary speed) of the output shaft 16 (third shaft), a torque change of the input shaft 12, a torque change of the elastic member 18, a torque change of the output shaft 16, an angle [rad] change of the crankshaft 14, engagement time of the input-side one-way clutch 20A, and engagement timing of the output-side one-way clutch 20B are shown from the top.

Regarding the angle of the crankshaft 14, an angular position at which the crank pin 36 is in closest proximity to the fixed member 38 (FIG. 9) is assumed to be 0° (0[rad]) and an angular position at which the crank pin 36 is at the farthest distance from the fixed member 38 (FIG. 11) is assumed to be 180° (π[rad]) as in the first embodiment. OFF in the graph of the time of engagement indicates the disengaged state (idling state), and ON in the same graph indicates the engaged state (meshed state).

As described above, in this embodiment, transmission of the drive force in so-called acceleration drive, in which the output shaft speed exceeds the input shaft speed, is performed. Specifically, the input shaft speed $R_{IN}$ is set to 5 [rad/sec], and the output shaft speed $R_{OUT}$ is set to 10 [red/sec]. The transmission gear ratio (acceleration ratio) is 2.0.

At time t1 in FIG. 13, the crankshaft 14 (second shaft) rotates at a speed equal to that of the input shaft 12 (first shaft). At this time, the input-side one-way clutch 20A is switched from the disengaged state to the engaged state, and the crankshaft 14 is biased by the input shaft 12 to the same direction of rotation as the input shaft 12.

Figure 10:
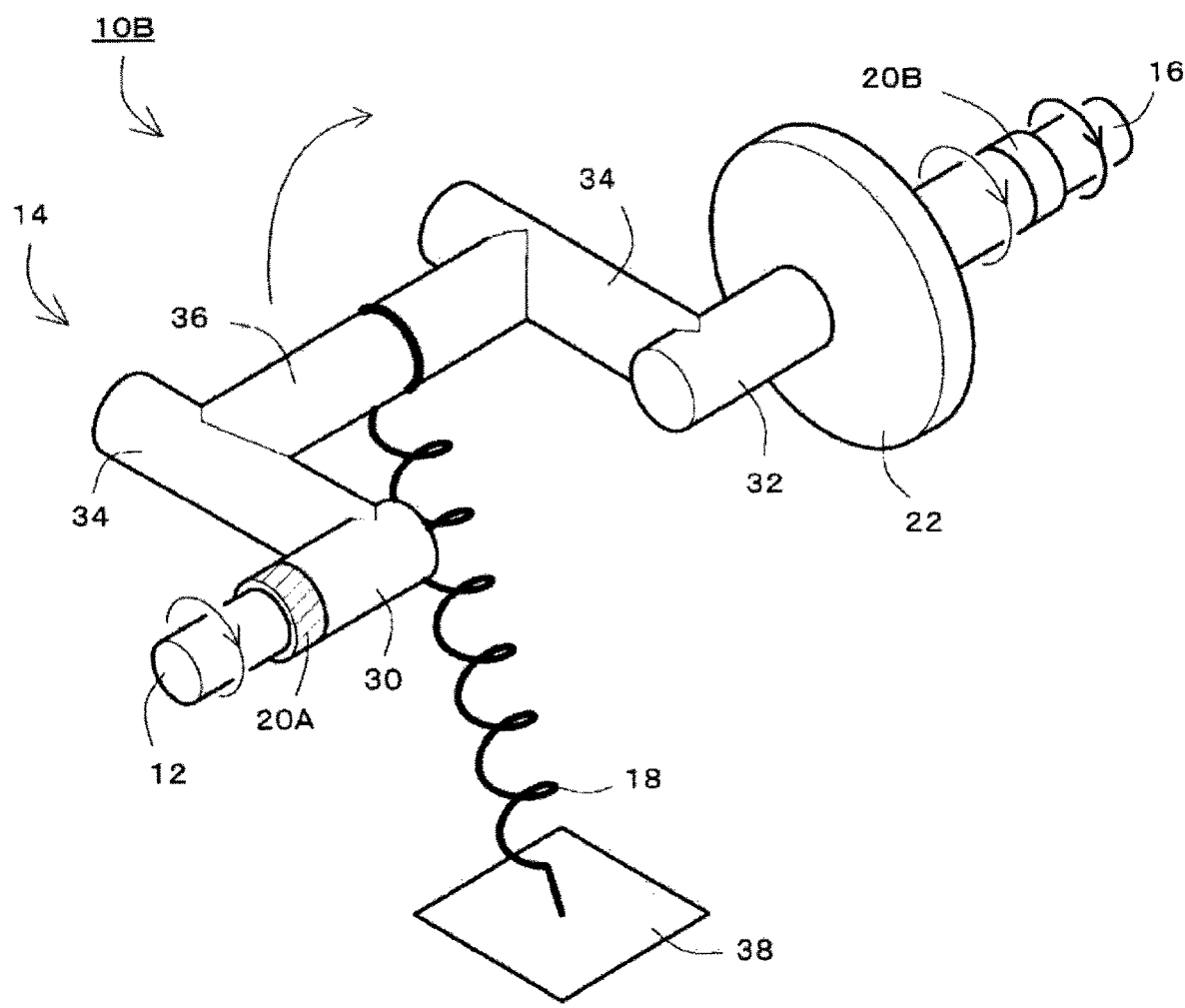
FIG. 10 is an explanatory drawing illustrating an action (crank phase=90°) of the drive force transmission device according to the second embodiment.
Figure 11:
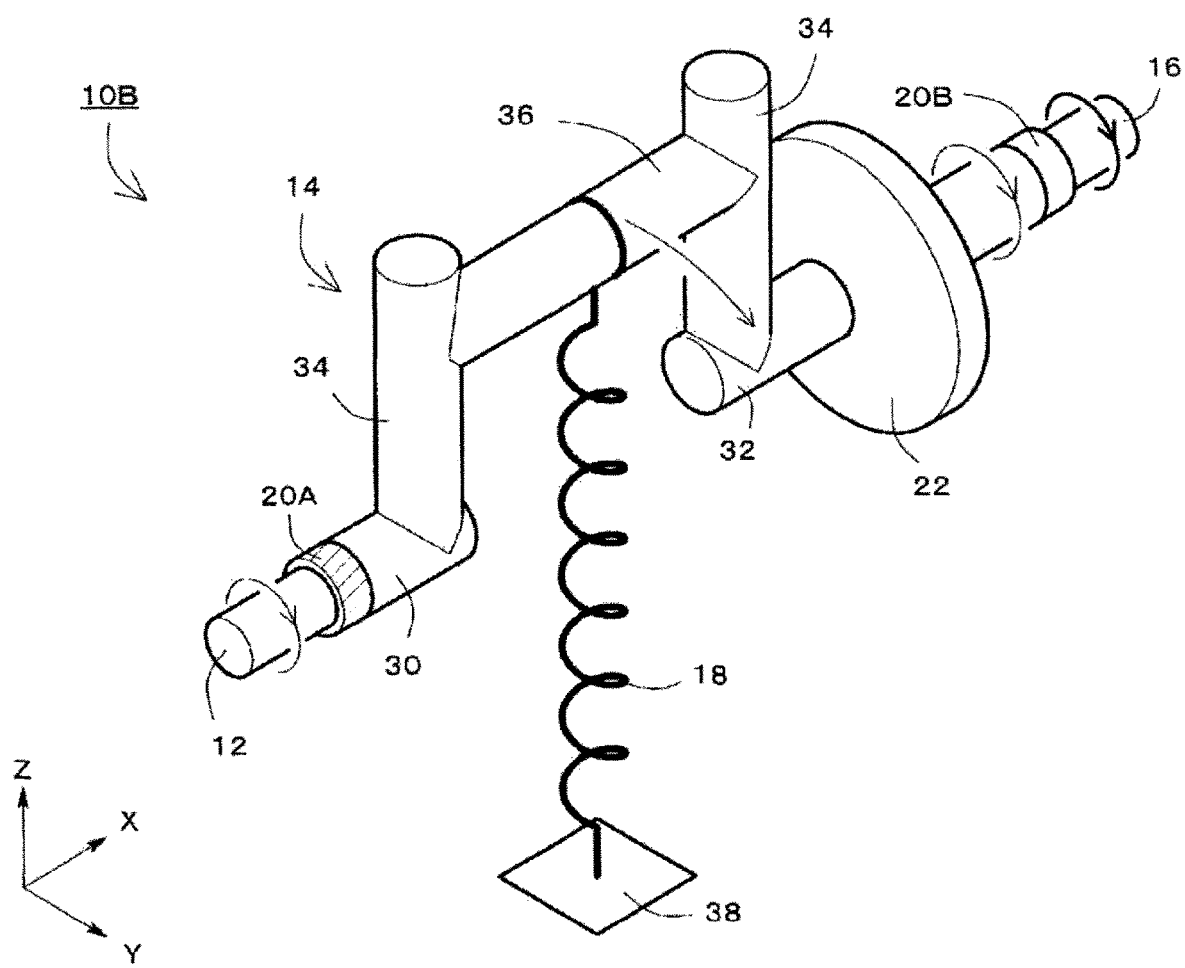
FIG. 11 is an explanatory drawing illustrating an action (crank phase=180°) of the drive force transmission device according to the second embodiment.

In association with the rotation of the crankshaft 14, the elastic member 18 is expanded and elastic energy is accumulated (energy accumulation) as illustrated in FIG. 10 to FIG. 11. Note that at this time, if the delay caused by the expansion of the elastic member 18 is ignored, the crankshaft 14 (second shaft) rotates at a rotary speed substantially the same as that of the input shaft 12 (first shaft), and the output-side one-way clutch 20B enters the disengaged state (idling state).

Figure 12:
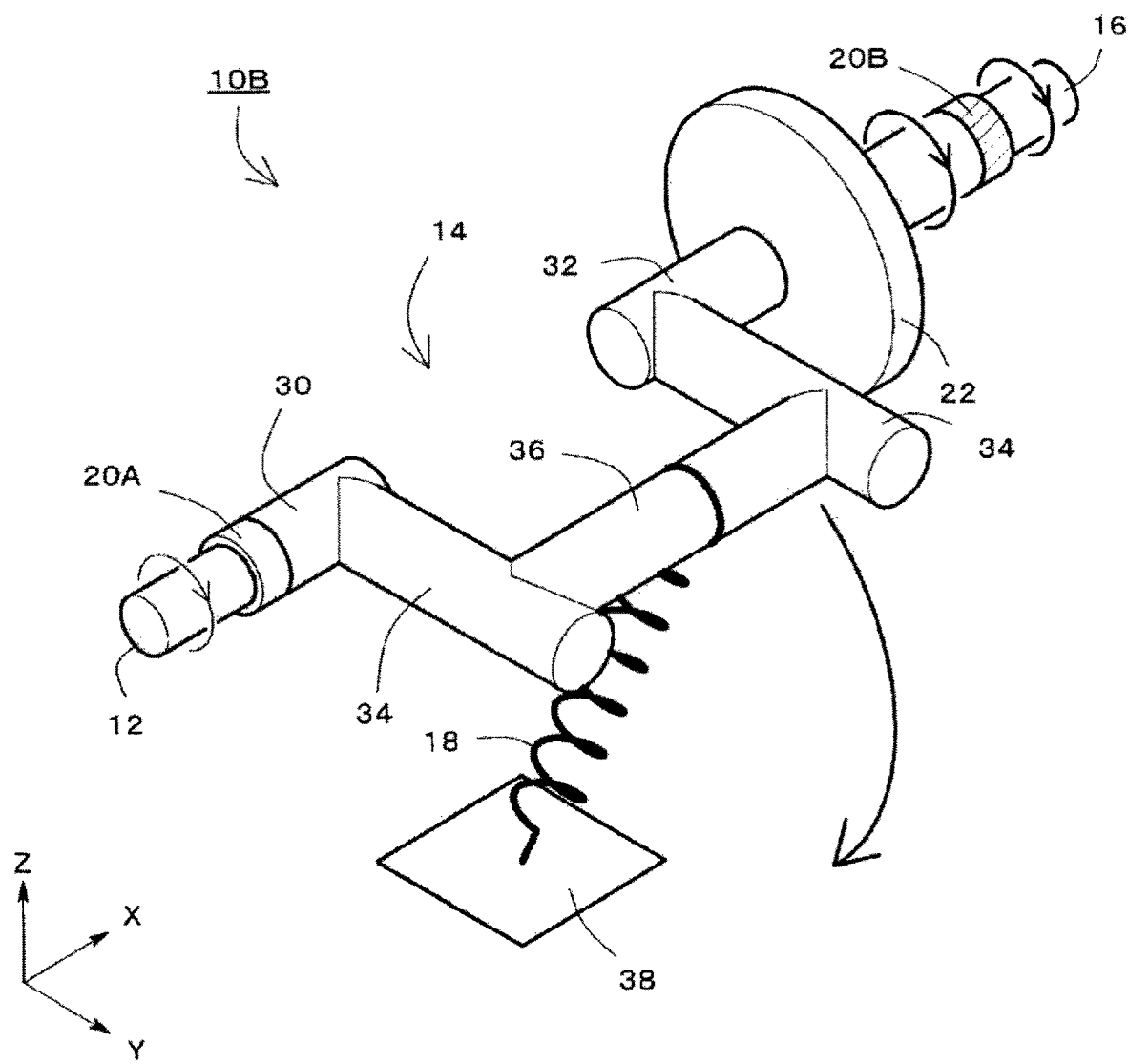
FIG. 12 is an explanatory drawing illustrating an action (crank phase=270°) of the drive force transmission device according to the second embodiment.

As illustrated in FIG. 11, when the crank pin 36 is moved to a position farthest from the fixed member 38, and passes beyond an angle of the crankshaft 14 at 180° (π), that is, the uppermost point at which the elastic member 18 is expanded to the maximum, the elastic member 18 starts to contract. As illustrated in FIG. 12, the elastic member 18 is biased to rotate the crankshaft 14 in the process of the contraction (energy discharge).

At time t2 in FIG. 13, the rotary speed $R_{MID}$ of the crankshaft 14 exceeds the rotary speed $R_{IN}$ of the input shaft 12, and the input-side one-way clutch 20A is switched from the engaged state to the disengaged state.

At time t3 in FIG. 13, when the rotary speed $R_{MIN}$ of the crankshaft 14 (second shaft) reaches a speed equal to that of the output shaft 16 (third shaft), the output-side one-way clutch 20B is switched from the disengaged state to the engaged state. In association with the switching of the state, the output shaft 16 is biased to rotate (energy discharge) by the crankshaft 14 (and the elastic member 18).

At time t4, when the speed of the crankshaft 14 is reduced to a speed lower than the speed of the output shaft 16, the output-side one-way clutch 20B is switched from the engaged state to the disengaged state. When the speed of the crankshaft 14 is reduced to a speed equal to that of the input shaft 12, the input-side one-way clutch 20A is switched from the disengaged state to the engaged state in the same manner as at time t1. From then onward, the actions from FIG. 9 to FIG. 12 are repeated in sequence.

In this embodiment as well, as disengagement/engagement of the input-side one-way clutch 20A and the output-side one-way clutch 20B are mechanically switched in accordance with the expansion and contraction of the elastic member 18, a brake control circuit that breaks the crankshaft 14 or the like in the energy accumulation process and the energy discharging process of the elastic member 18 or the like does not have to be provided.

Figure 14:
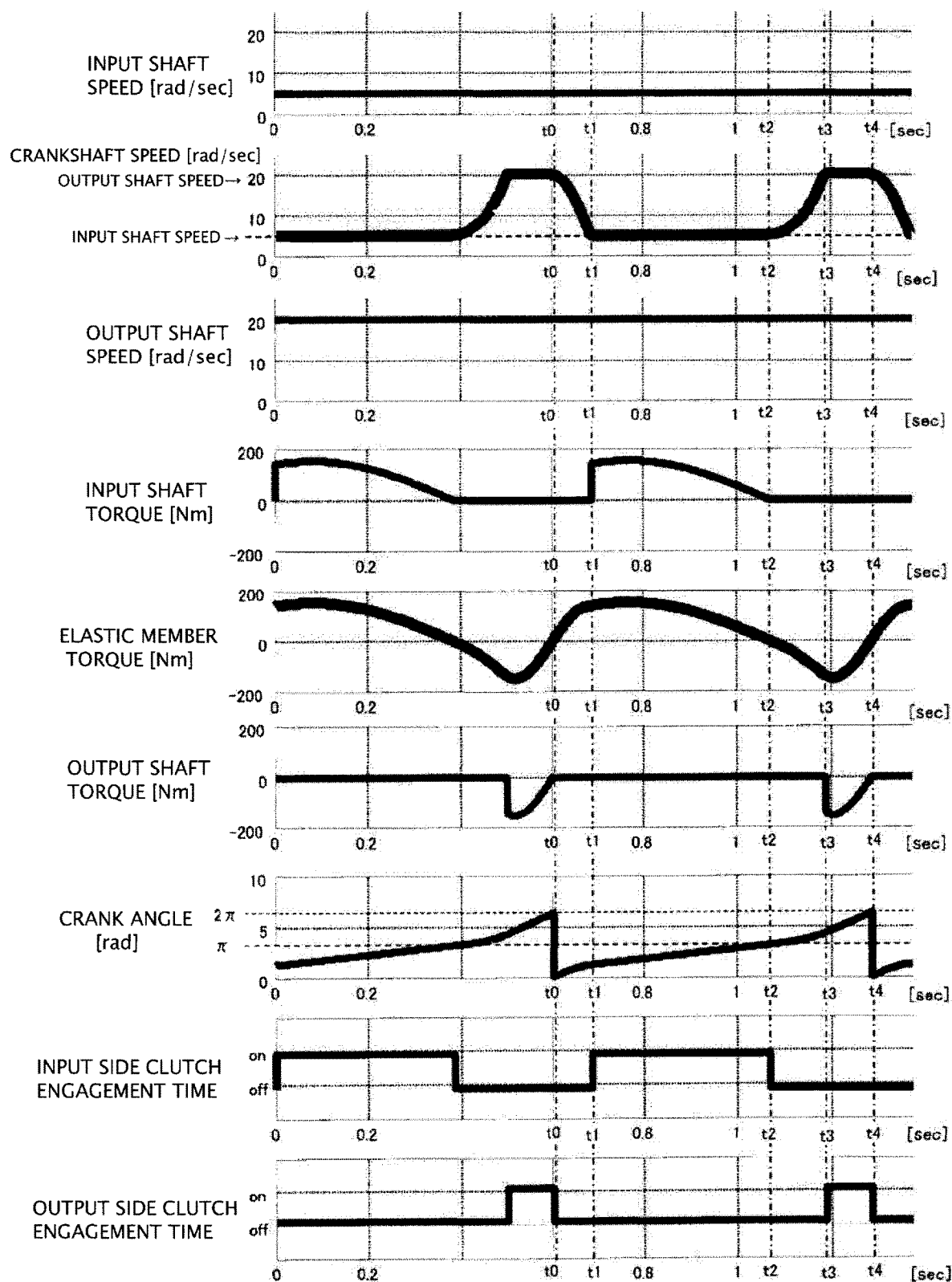
FIG. 14 is a drawing illustrating a timing chart (transmission gear ratio=4.0) of the drive force transmission device according to the second embodiment.

FIG. 14 illustrates an example in which the transmission gear ratio (acceleration ratio) is 4.0. Specifically, the input shaft speed $R_{IN}$ is set to 5 [rad/sec], and the output shaft speed $R_{OUT}$ is set to 20 [red/sec].

At this time, the transmission gear ratio calculation unit 60 (see FIG. 2B) of the control apparatus 26 acquires an input shaft speed $R_{IN}$ and an output shaft speed $R_{OUT}$ respectively from the input shaft rotary speed sensor 58A and the output shaft rotary speed sensor 58B to calculate the transmission gear ratio as transmission gear control. The fixed member position calculation unit 62 calculates a difference between the current transmission gear ratio and the received transmission gear ratio. For example, when the transmission gear ratio is increased from 2.0 to 4.0, the difference becomes 2.0. The fixed member position calculation unit 62 sends the stage travel distance of the fixed member 38 corresponding to the transmission gear ratio difference 2.0 to the motor control unit 64. The motor control unit 64 sends a control signal including a motor control amount (number of pulses) according to the received stage travel distance to the motor 44 (FIG. 8).

FIG. 14 illustrates an example of an action of the drive force transmission device 10B corresponding to the transmission gear ratio 4.0. In association with increase in transmission gear ratio (acceleration ratio), the relative distance between the fixed member 38 and the crank pin 36 is increased compared with the transmission gear ratio 2.0, and the rotary speed of the crank pin 36 biased to rotate by the elastic member 18 is increased to at least the same speed as the output shaft 16. Accordingly, the output-side one-way clutch 20B is switched from the disengaged state to the engaged state, and the elastic energy of the elastic member 18 is transmitted to the output shaft 16 (energy discharge).

Even when the transmission gear ratio is changed, the relative distance between the crank pin 36 and the fixed member 38 does not have to be increased in principle as long as the maximum speed of the elastic member 18 (and the crank pin 36) before the change is equal to that of the output shaft 16. However, a configuration in which a value obtained by multiplying the maximum speed of the crank pin 36 by a predetermined margin (for example, 0.8) is used as a threshold value considering a mechanical error (tolerance) of the output-side one-way clutch 20B and the measurement accuracy of the output shaft rotary speed sensor 58B, and the fixed member 38 is moved when the rotary speed $R_{OUT}$ of the output shaft 16 is below the threshold value, is also applicable.

The crankshaft 14 may be subject to deflection due to the elastic member 18. For example, in FIG. 11, the crankshaft 14 is deflected downward in the direction of the Z-axis in the drawing by the elastic member 18. By this deflection, the axial center (the input-side main journal 30 and the output-side main journal 32) of the crankshaft 14 is deflected, whereby a stress may be applied to sliding surfaces or the like of the input-side one-way clutch 20A and the output-side one-way clutch 20B.

Figure 15:
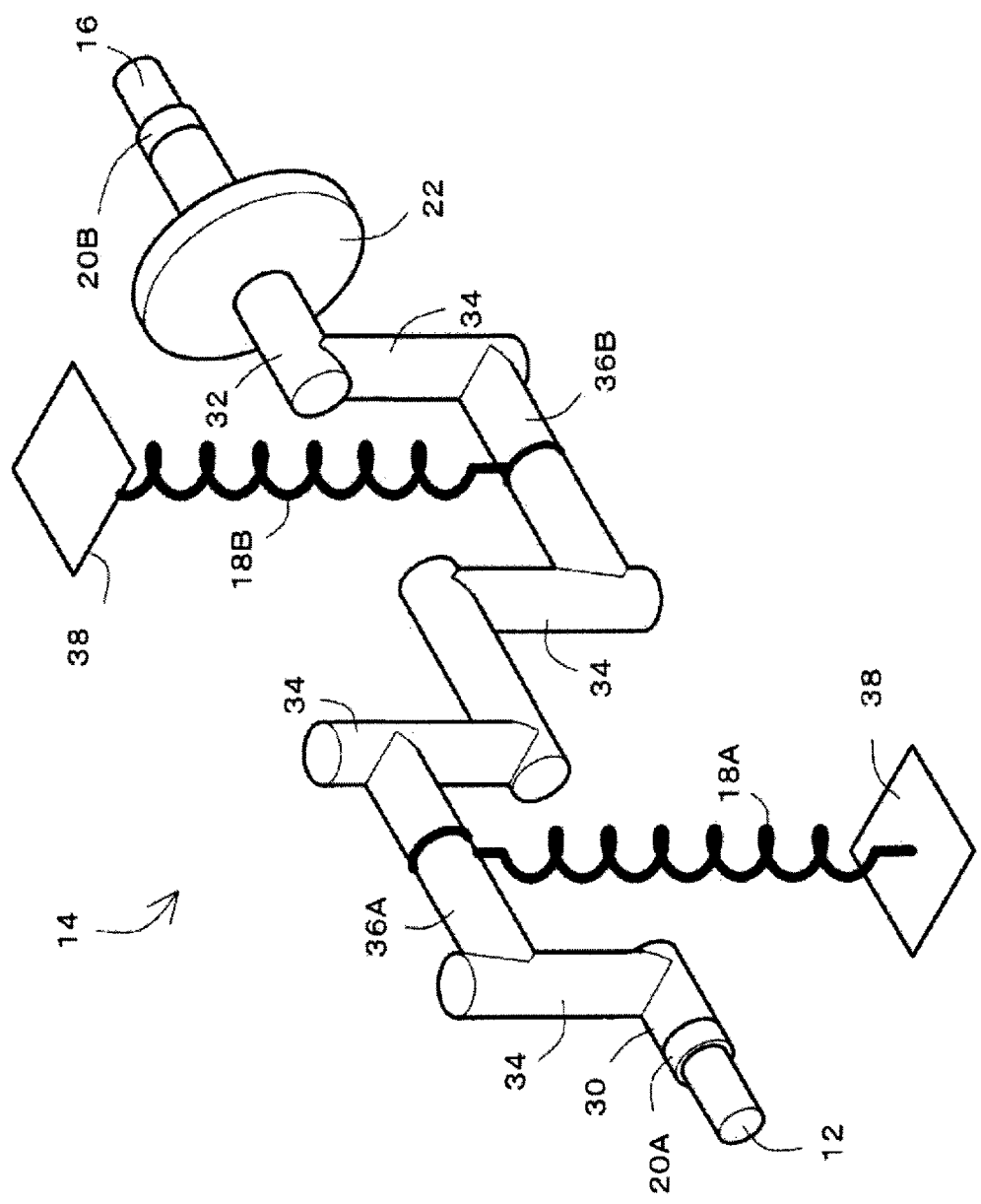
FIG. 15 is a drawing illustrating a modification of the drive force transmission device according to the second embodiment.

Therefore, the crankshaft 14 may be replaced by a horizontally opposed type as illustrated in FIG. 15. The crankshaft 14 illustrated in FIG. 15 is provided with two crank pins 36A and 36B so as to oppose each other and be shifted from each other by 180° with reference to the rotation phase of the crankshaft 14. By slidably connecting elastic members 18A and 18B to the crank pins 36A and 36B as described above respectively, forces of the respective elastic members 18A, 18B that deflect the crankshaft 14 cancel each other out.

Third Embodiment

Figure 16:
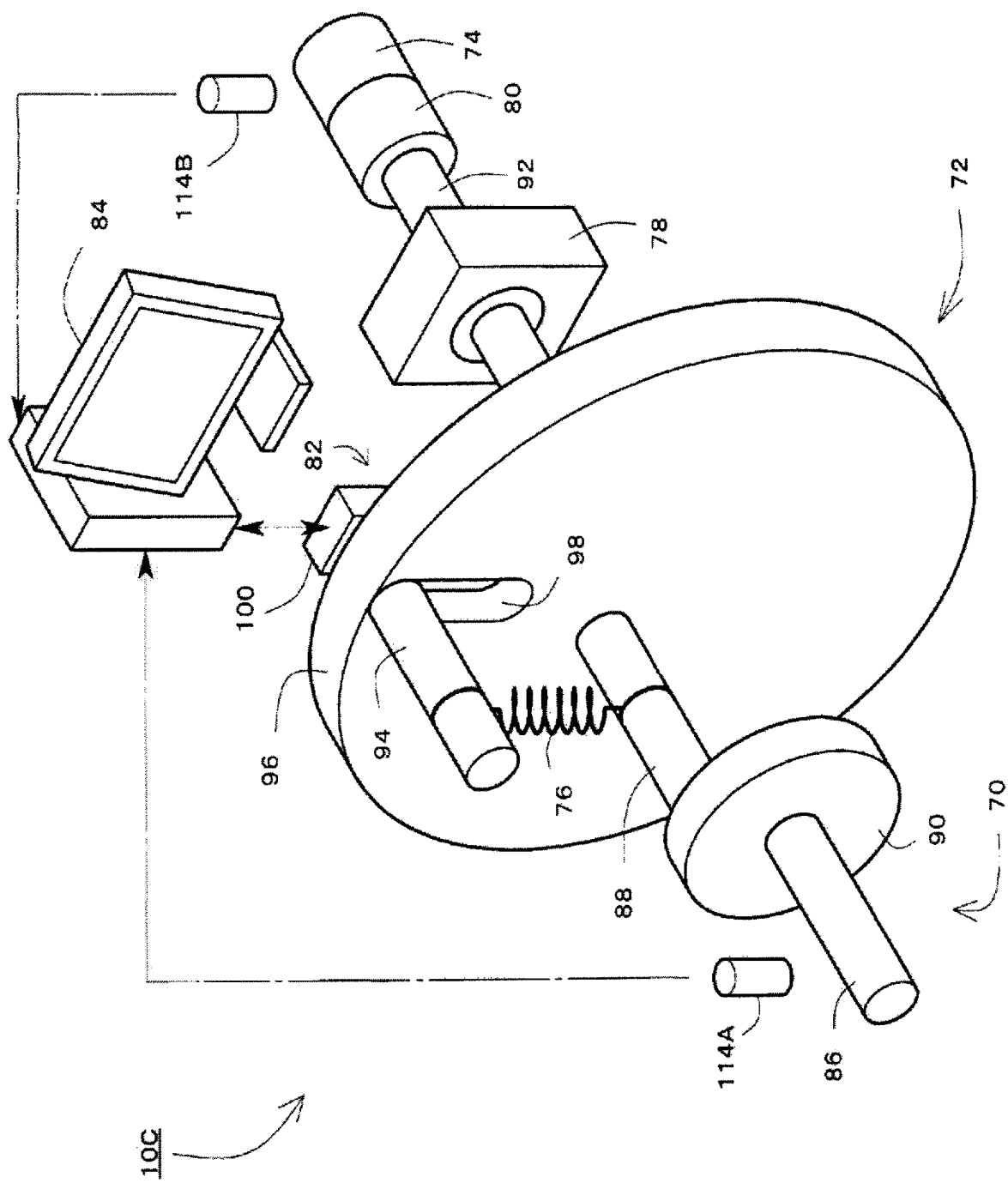
FIG. 16 is a perspective view illustrating a drive force transmission device according to a third embodiment.

FIG. 16 illustrates a drive force transmission device 10C according to a third embodiment. The drive force transmission device 10C includes an input shaft 70 (first shaft), a crank disc 72 (second shaft), an output shaft 74 (third shaft), an elastic member 76, a backstop 78 (backstop mechanism), a one-way clutch 80, a movable mechanism 82 and a control apparatus 84. The drive force transmission device 10C transmits a drive force from the input shaft 70 to the output shaft 74 via the crank disc 72 and the elastic member 76 connected thereto.

As will be described later, in the drive force transmission device 10C, mainly deceleration drive in which a rotary speed $R_{IN}$ of the input shaft 70 (first shaft) exceeds a rotary speed $R_{OUT}$ of the output shaft 74 (third shaft) ($R_{IN} > R_{OUT}$), or reverse drive in which the input shaft 70 (first shaft) rotates in a direction opposite to the output shaft 74 (third shaft), is performed based on the drive force transmission process.

The input shaft 70 (first shaft) is driven to rotate by a drive source, not illustrated. The input shaft 70 has, for example, a crank disc shape, and includes a main shaft 86 which serves as a central axis, an off-axis pin 88 provided at a position offset from the axis of the main shaft 86, and a disc plate 90 connecting these members.

The off-axis pin 88 may be provided so that the axial center thereof extends in parallel to the main shaft 86. The input shaft 70 is formed so that a crank radius of the input shaft 70, that is, a distance between the axial center of the main shaft 86 and the axial center of the off-axis pin 88 becomes shorter than, for example, the crank radius of the crank disk 72 (second shaft), that is, the distance between an axial center of a main shaft 92 and the axial center of an off-axis pin 94. The input shaft 70 is spaced apart from the crank disc 72 and, more specifically, the off-axis pin 88 is spaced apart from the disc plate 90. For example, the terminal end of the off-axis pin 88 in the axial direction is spaced apart from a disc plate 96 of the crank disc 72.

A force from the elastic member 76, the shaft-side magnet 124, and the fixed-side magnet 128 is applied to the crank disc 72 (second shaft) in a predetermined direction of rotation and in a direction opposite to the predetermined direction of rotation. The strength of the force varies with the rotation, in the same manner as in the first and second embodiments.

The crank disc 72 includes the main shaft 92 which serves as a central axis, the off-axis pin 94 provided at a position offset from the axis of the main shaft 92, and the disc plate 96 connecting these members. The disc plate 96 is provided with a groove 98 that extends in a radial direction of the disc plate 96, and the off-axis pin 94 is provided in the groove 98. The axial center of the off-axis pin 94 is provided in parallel with, for example, the axial center of the main shaft 92. As will be described later, the movable mechanism 82 allows movement of the off-axis pin 94 in the radial direction of the disc plate 96, whereby the crank radius becomes variable. With the variable crank radius, expansion and contraction width of the elastic member 76, in other words, the spring stiffness, may be varied.

The main shaft 92 of the crank disc 72 is provided coaxially to the input shaft 70. In addition, the main shaft 92 is connected to the backstop 78 and the terminal end thereof is connected to the one-way clutch 80.

The elastic member 76 is connected at one end thereof to the off-axis pin 88 of the input shaft 70 (first shaft), and at the other end thereof to the off-axis pin 94 of the crank disc 72 (second shaft). For example, both end portions of the elastic member 76 are formed into a ring shape, and are slidably wound around outer peripheries of the off-axis pins 88 and 94. The elastic member 76 includes a spring member such as a helical spring, for example.

The backstop 78 (backstop mechanism) is connected to the main shaft 92 of the crank disc 72, and prevents a reverse rotation of the main shaft 92. The backstop 78 includes, for example, a one-way clutch, and the inner race is fixedly connected to the main shaft 92 and the outer race is fixed to the fixed member such as a case, which is not illustrated. The backstop 78 enters the disengaged state (idling state) when the main shaft 92 rotates in the same direction of rotation as the output shaft 74 (third shaft), and enters the engaged state (meshed state) when the main shaft 92 rotates in the opposite direction. In other words, the engaging mechanism (a meshing direction of the engaging members and the like) may be created so as to prevent (lock) the reverse rotation of the main shaft 92.

The one-way clutch 80 is provided between the main shaft 92 of the crank disc 72 (second shaft) and the output shaft 74 of the crank disc 72 (second shaft) and connects both members. The main shaft 92 and the output shaft 74 are disposed coaxially.

The one-way clutch 80 includes, for example, an over running clutch. For example, the main shaft 92 of the crank disc 72 is fixedly connected to an inner race of the one-way clutch 80, and the output shaft 74 is fixedly connected to an outer race of the one-way clutch 80.

The engaging mechanism (the meshing direction of the engaging members and the like) is created so that the one-way clutch 80 enters the engaged state (meshed state) when the rotary speed $R_{MID}$ of the crank disc 72 (second shaft) is equal to or higher than the rotary speed $R_{OUT}$ of the output shaft 74 (third shaft) ($R_{MID} \geq R_{OUT}$), and enters the disengaged state (idling state) when the rotary speed $R_{MID}$ of the crank disc 72 is lower than the rotary speed $R_{OUT}$ of the output shaft 74 ($R_{MID} < R_{OUT}$).

The movable mechanism 82 allows the off-axis pin 94 of the crank disc 72 to move along the radial direction of the crank disc 72. The movable mechanism 82 includes a rack, not illustrated, formed in the groove 98, a pinion, not illustrated, connected to the off-axis pin 94, and a motor 100 that rotates the pinion.

The control apparatus 84 controls the movable mechanism 82 to adjust the spring stiffness of the elastic member 76. FIG. 17A illustrates a hardware configuration of the control apparatus 84, and FIG. 17B illustrates a functional block diagram of the control apparatus 84.

The control apparatus 84 includes a computer as illustrated in FIGS. 2A and 2B, includes a CPU 102, a memory 104, a hard disk drive 106, an input unit 108 such as a keyboard and a mouse, and an output unit 110 which is a display device such as a display, and an I/O interface 112, and these members are respectively connected via system buses.

The hard disk drive 106 is a computer readable non-volatile storage medium in which programs for executing transmission gear control described later are stored. By the program executed by the CPU 102, the computer that constitutes the control apparatus 84 functions as respective functional parts that perform transmission gear control (described later) illustrated in FIG. 17B.

The control apparatus 84 acquires a rotary speed $R_{IN}$ of the input shaft 70 (first shaft) from an input shaft rotary speed sensor 114A. The control apparatus 84 also acquires a rotary speed $R_{OUT}$ of the output shaft 74 (third shaft) from an output shaft rotary speed sensor 114B. Although illustration is omitted, a crank disc rotary speed sensor that detects the rotary speed $R_{MID}$ of the crank disc 72 (second shaft) is provided for the control apparatus 84 to acquire the rotary speed $R_{MID}$.

The control apparatus 84 controls a range of spring stiffness of the elastic member 76, in other words, a force applied to the crank disc 72 (second shaft) based on a transmission gear ratio (demand value) acquired from a rotary speed $R_{IN}$ of the input shaft 70 (first shaft) and the rotary speed $R_{OUT}$ of the output shaft 74 (third shaft). As illustrated in FIG. 17B, the control apparatus 84 includes a transmission gear ratio calculating unit 116 (demand value acquiring unit), a pin interval calculating unit 118, and a motor control unit 120 (control unit).

The transmission gear ratio calculating unit 116 (demand value acquiring unit) acquires the rotary speed $R_{IN}$ of the input shaft 70 (first shaft) from the input shaft rotary speed sensor 114A and acquires the rotary speed $R_{OUT}$ of the output shaft 74 (third shaft) from the output shaft rotary speed sensor 114B. The transmission gear ratio calculation unit 116 acquires a transmission gear ratio $R_{OUT}/R_{IN}$ (demand value), which is a ratio of the rotary speed $R_{OUT}$ of the output shaft 74 (third shaft) with respect to the rotary speed $R_{IN}$ of the input shaft 70 (first shaft).

The transmission gear ratio is sent from the transmission gear ratio calculation unit 116 to the pin interval calculating unit 118. The pin interval calculating unit 118 memorizes a (current) transmission gear ratio set when receiving the transmission gear ratio, and the pin interval calculating unit 118 calculates a difference between the current transmission gear ratio and the transmission gear ratio received from the transmission gear ratio calculation unit 116.

In the case where the above-described difference is included in a predetermined threshold range, for example, in the case where the ratio between both ratios is 0.95 to 1.05 inclusive, it is determined that the spring stiffness does not have to change, and a pin travel distance of 0 is sent to a motor control unit 120. In contrast, in the case where the above-described difference exceeds the predetermined threshold range, the pin interval calculating unit 118 calculates a pin travel distance based on the difference of the transmission gear ratio and sends the obtained value to the motor control unit 120.

The pin travel amount may be calculated based on a torque valance between the input shaft 70 and the output shaft 74. For example, as illustrated later, an increase in input torque may be achieved by moving the off-axis pin 94 radially outward when torque (input torque) transmitted from the input shaft 70 to the output shaft 74 via the elastic member 76 and the crank disc 72 is smaller than torque that is returned to the input shaft 70 by energy discharged based on the contraction of the elastic member 76 according to the speed difference between the input shaft 70 (first shaft) and the output shaft 74 (third shaft).

In the motor control unit 120, the drive amount of the motor 100 of the movable mechanism 82 is calculated based on the pin travel amount. For example, a control signal such as a pulse signal is output according to the pin travel amount to the motor 100. The movable mechanism 82 rotates together with the crank disc 72, and hence the control signal may be sent via wireless network. The control signal may be sent via a signal line (wire) via a slip ring or the like.

In this manner, by changing the spring stiffness of the elastic member 76 based on the speed change of the input shaft 70 (first shaft) and the output shaft 74 (third shaft), in other words, by controlling the range of the force applied from the elastic member 76 to the crank disc 72 (second shaft), the drive force may be transmitted smoothly from the input shaft 70 to the output shaft 74.

FIG. 18 to FIG. 22 schematically illustrate actions of the drive force transmission device 10C according to this embodiment (third embodiment). In FIG. 18 to FIG. 22, the backstop 78 with hatching is in the engaged state (locked state) and the backstop 78 without hatching is in the disengaged state (idling state). In the same manner, the one-way clutch 80 with hatching is in the engaged state and the one-way clutch 80 without hatching is in the disengaged state. Devices which are not closely related to the description of actions given here will not be illustrated here.

Figure 23:
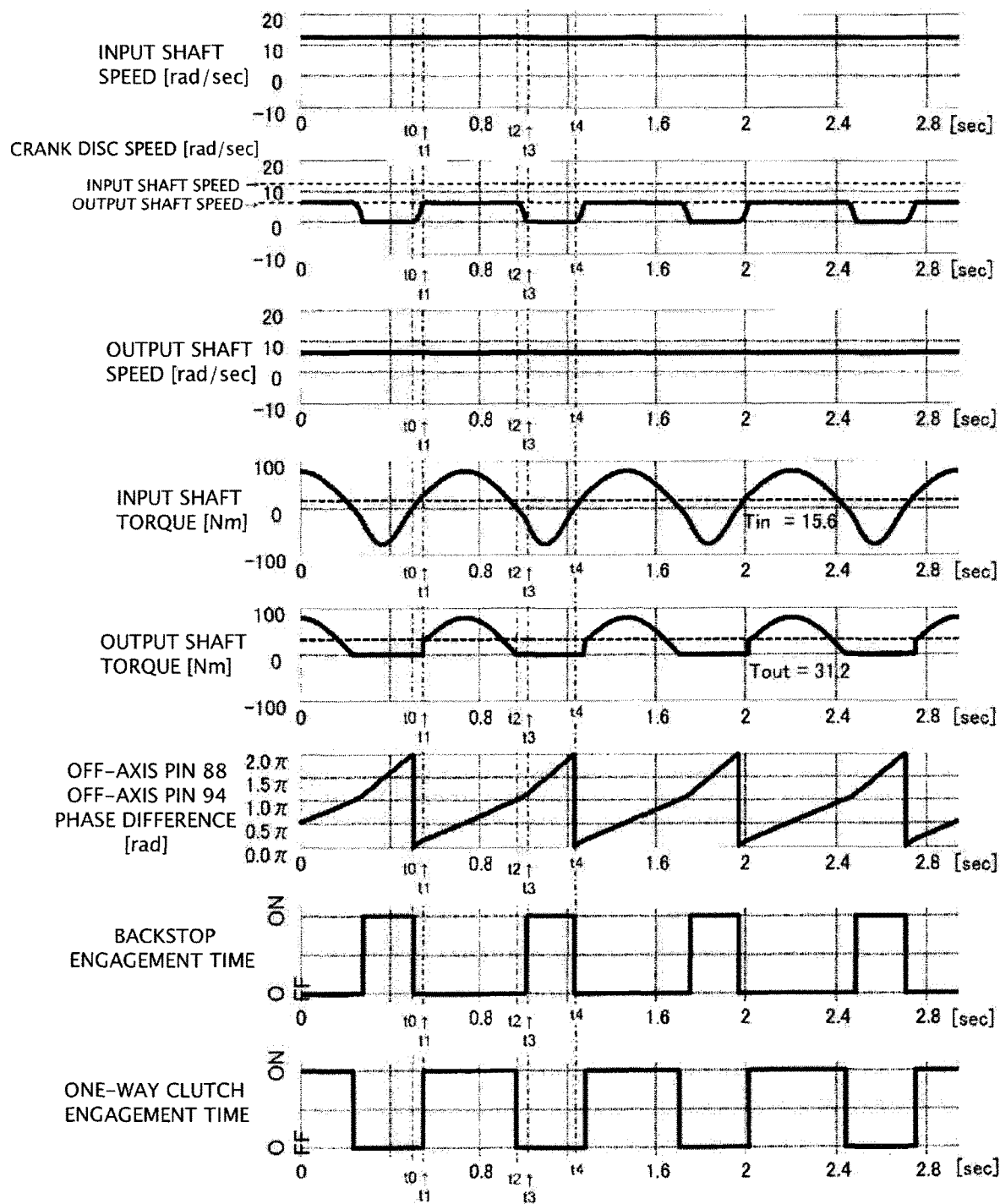
FIG. 23 is a drawing illustrating a timing chart (transmission gear ratio=0.5) of the drive force transmission device according to the third embodiment.

FIG. 23 illustrates a temporal change such as the speed change in association with driving of the drive force transmission device 10C. Specifically, in FIG. 23, speed of input shaft 70 (first shaft) [rad/sec], speed of the crank disc 72 (second shaft) [rad/sec], speed of the output shaft 74 (third shaft) [rad/sec], a torque change of the input shaft 70, a torque change of the output shaft 74, a phase difference between the off-axis pin 88 of the input shaft 70 and the off-axis pin 94 of the crank disc 72 [rad], a time of engagement of the backstop 78, and engagement timing of the one-way clutch 80 are shown from the top.

Figure 19:
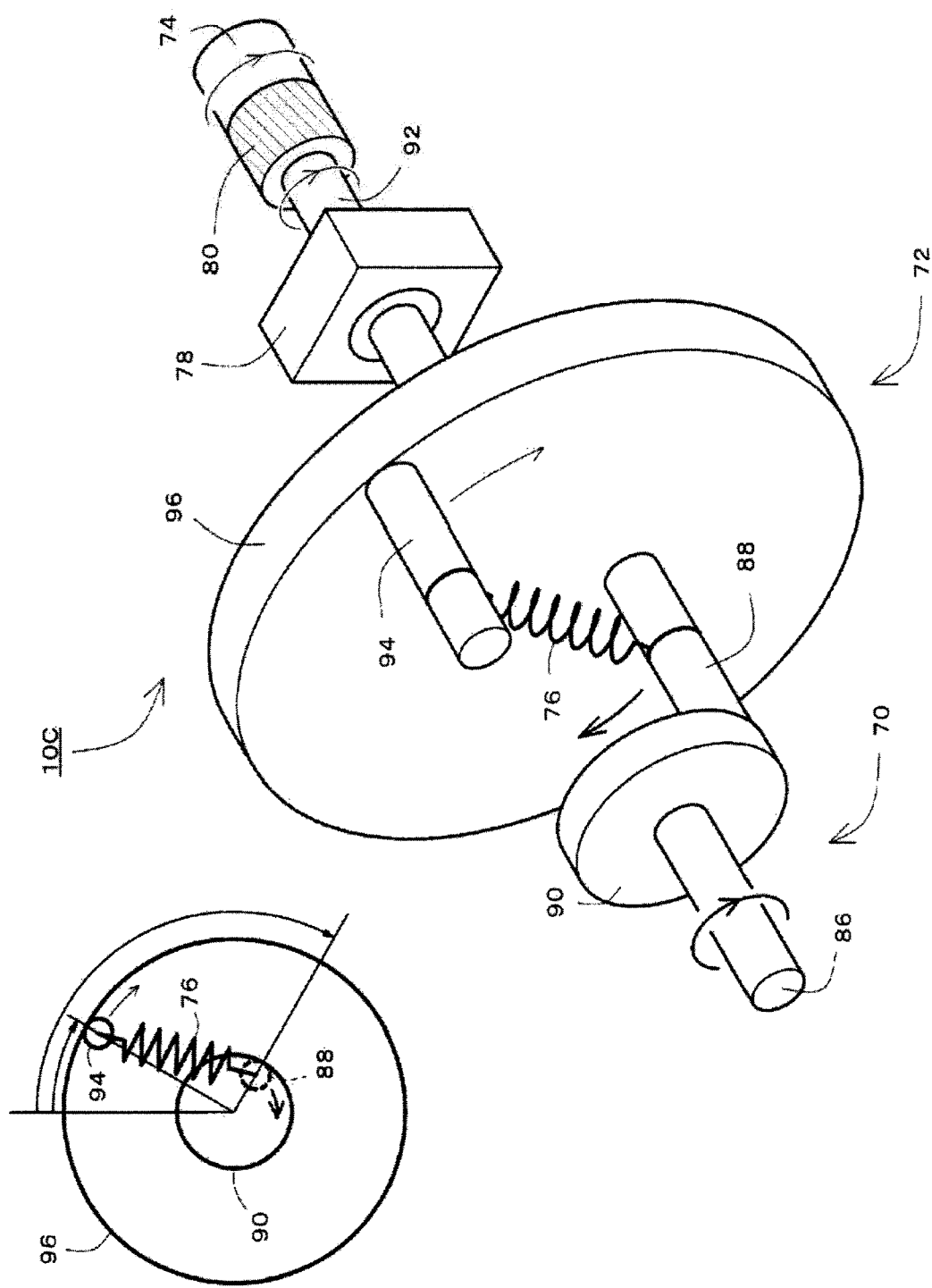
FIG. 19 is an explanatory drawing illustrating an action (deceleration, off-axis pin phase difference=90°) of the drive force transmission device according to the third embodiment.

The phase difference between the off-axis pin 88 and the off-axis pin 94 indicates, for example, as illustrated on the upper left of FIG. 19, an angle formed between the off-axis pin 88 and the off-axis pin 94 about the center at an axial center of the crank disc 72 and the input shaft 70. OFF in the graph of the time of engagement indicates the disengaged state (idling state), and ON in the same graph indicates the engaged state (meshed state).

In FIG. 18 to FIG. 23, an example in which the rotary speed $R_{IN}$ of the input shaft 70 (first shaft) exceeds the rotary speed $R_{OUT}$ of the output shaft 74 (third shaft) ($R_{IN}>R_{OUT}$) at the time of deceleration is illustrated. Specifically, as illustrated in FIG. 23, the rotary speed $R_{IN}$ of the input shaft 70 and the rotary speed $R_{OUT}$ of the output shaft 74 are set to achieve the transmission gear ratio 0.5 (deceleration ratio 2.0).

Figure 18:
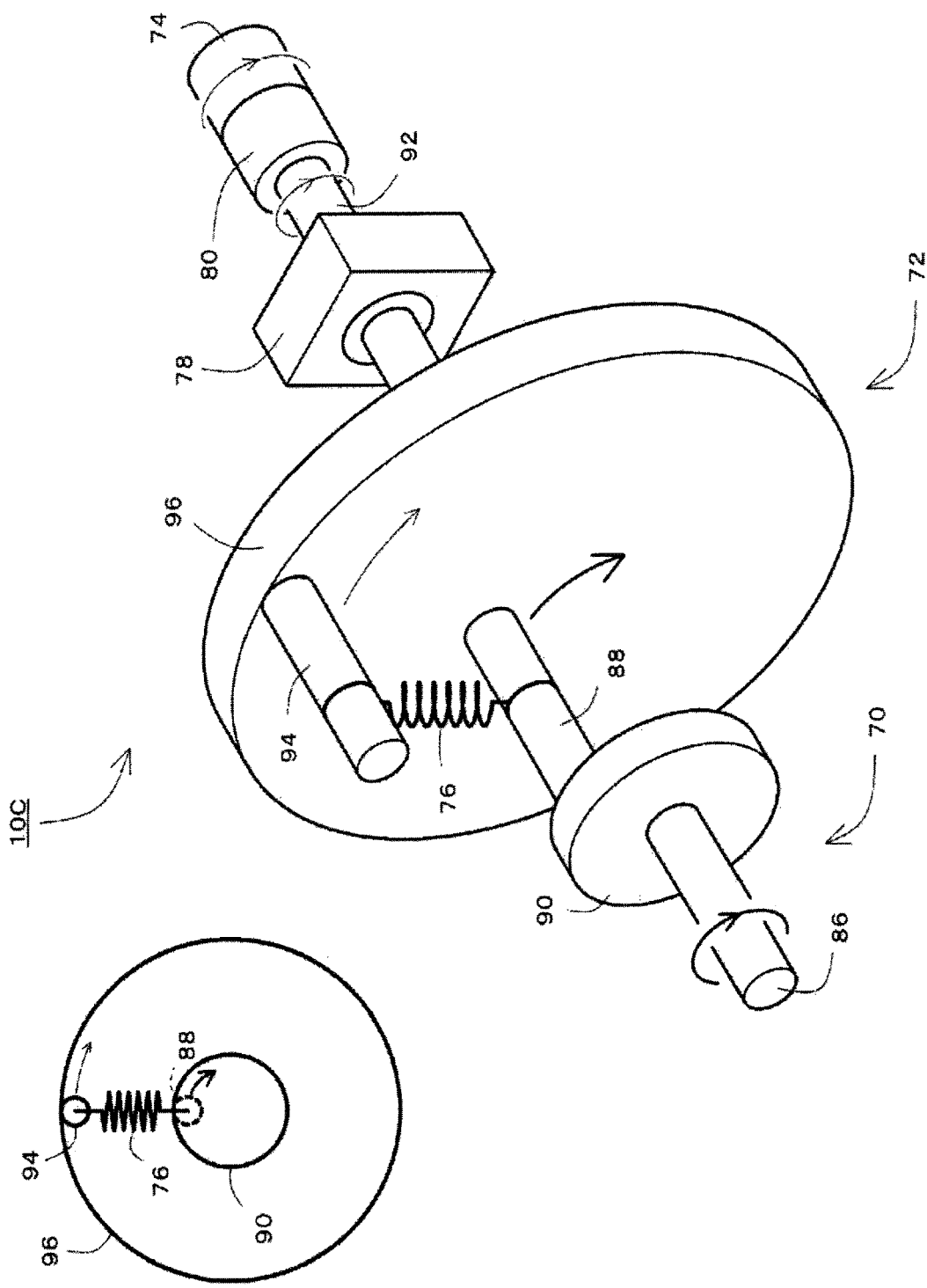
FIG. 18 is an explanatory drawing illustrating an action (deceleration, off-axis pin phase difference=0°) of the drive force transmission device according to the third embodiment.

At time t0 in FIG. 23, as illustrated in FIG. 18, the phase difference between the off-axis pin 88 and the off-axis pin 94 may become 0. In the drawing on the upper left in FIG. 18, the off-axis pin 88, being indicated by a broken line, indicates that the off-axis pin 88 is hidden by the disc plate 90 when viewed from the front.

At this time, as will be described later, the backstop 78 is switched from the engaged state (locked state) to the disengaged state. The one-way clutch 80 is in the disengaged state. At this time, the elastic member 76 is expanded due to the difference in rotary speed between the off-axis pin 88 and the off-axis pin 94 of the input shaft 70.

In addition, the off-axis pin 94 is pulled by the elastic member 76 and is rotated. When the rotary speed reaches a speed equal to that of the output shaft 74 (third shaft), as illustrated at time t1 in FIG. 23 and in FIG. 19, the one-way clutch 80 is switched from the disengaged state to the engaged state. Consequently, a drive force is transmitted from the input shaft 70 to the output shaft 74 via the elastic member 76 and the crank disc 72.

Figure 20:
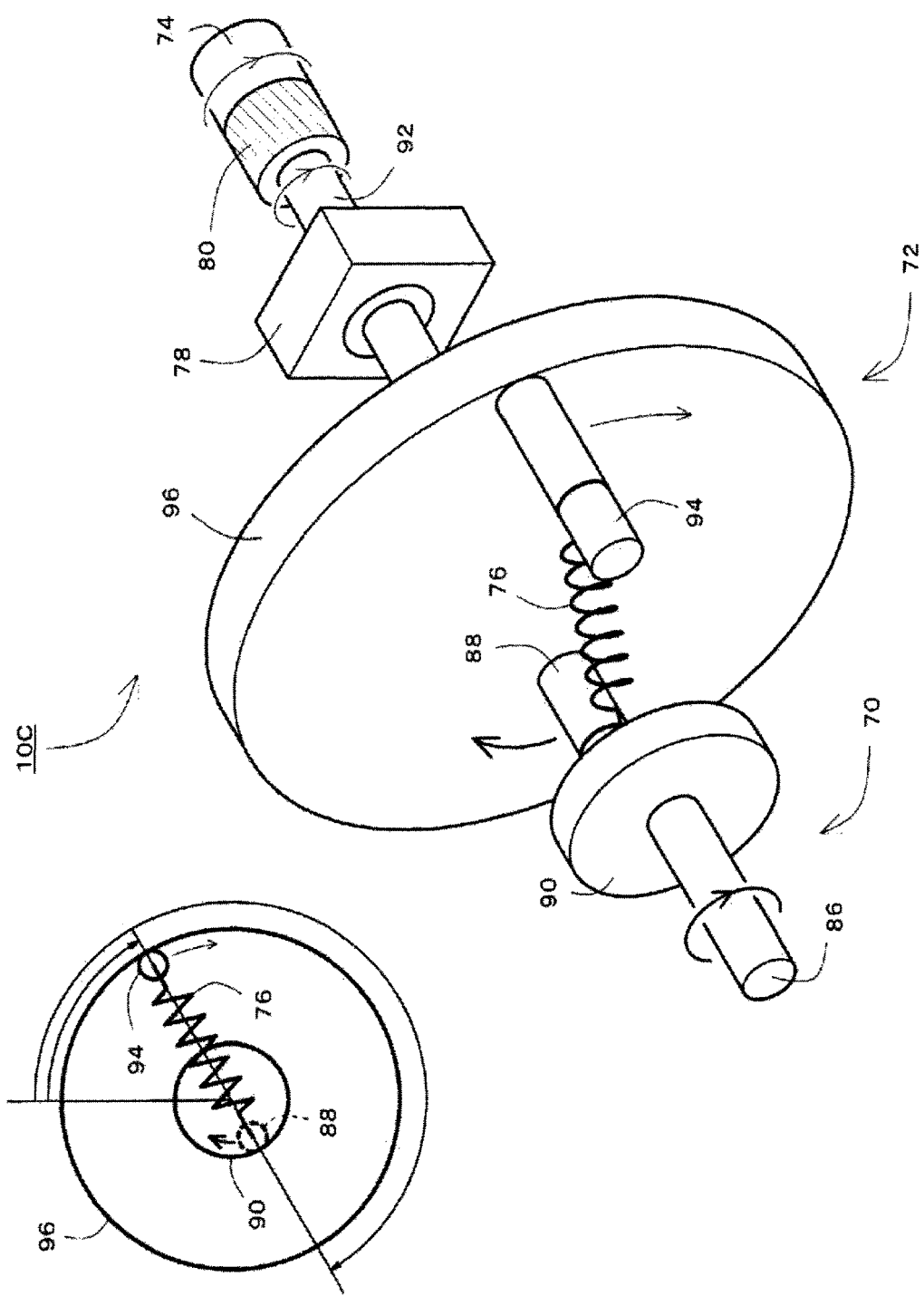
FIG. 20 is an explanatory drawing illustrating an action (deceleration, off-axis pin phase difference=180°) of the drive force transmission device according to the third embodiment.

In addition, when the phase difference between the off-axis pin 88 and the off-axis pin 94 is expanded based on the difference in rotary speed between the input shaft 70 (first shaft) and the output shaft 74 (third shaft), the elastic member 76 is expanded and elastic energy is accumulated (energy accumulation). In addition, as shown at time t2 in FIG. 23, when the phase difference reaches 180° (π), the elastic member 76 is expanded to the maximum and reaches the uppermost point as illustrated in FIG. 20.

When the phase difference increases to 180° or more and the phase difference between the off-axis pin 88 and the off-axis pin 94 is increased, the off-axis pin 94 is biased to rotate in the opposite direction from the input shaft 70 (and the output shaft 74) by compression (energy discharge) of the elastic member 76 as shown in a lower part in FIG. 21

Figure 22:
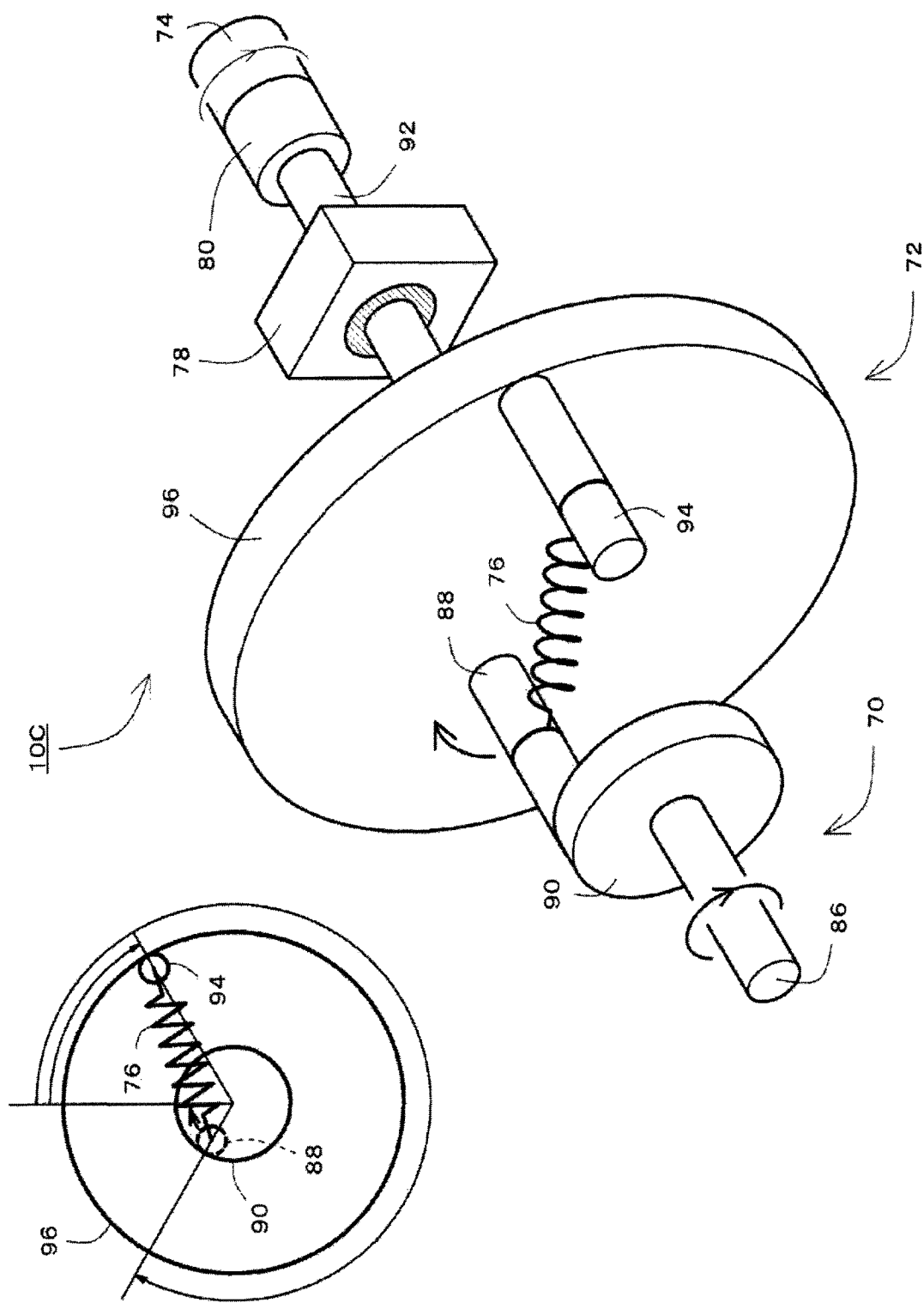
FIG. 22 is an explanatory drawing illustrating an action (deceleration, off-axis pin phase difference=exceeding 180°) of the drive force transmission device according to the third embodiment.

At this time, as shown at time t3 in FIG. 23 and FIG. 22, the backstop 78 is switched from the disengaged state to the engaged state (locked state) and the reverse rotation of the crank disc 72 is prevented (locked).

During a period in which the crank disc 72 is in the locked state, the input shaft 70 continues to rotate, and the phase difference between the off-axis pin 88 and the off-axis pin 94 becomes 0°. From time t0 to t4, actions illustrated in FIG. 18, FIG. 19, FIG. 20, and FIG. 22 are performed in sequence.

In an input shaft torque graph in FIG. 23, an average value of the input torque Tin=15.6 is shown. In an output side torque graph, the average value of the output torque Tout=31.2 is shown. As illustrated in the drawing, the torque is increased to double according to the transmission gear ratio of 0.5.

In this manner, according to this embodiment, as disengagement/engagement of the backstop 78 and the one-way clutch 80 are mechanically switched in accordance with the expansion and contraction of the elastic member 18, a brake control circuit or the like that breaks the crank disc 72 or the like in the energy accumulation process and the energy discharging process of the elastic member 76 does not have to be provided.

Figure 24:
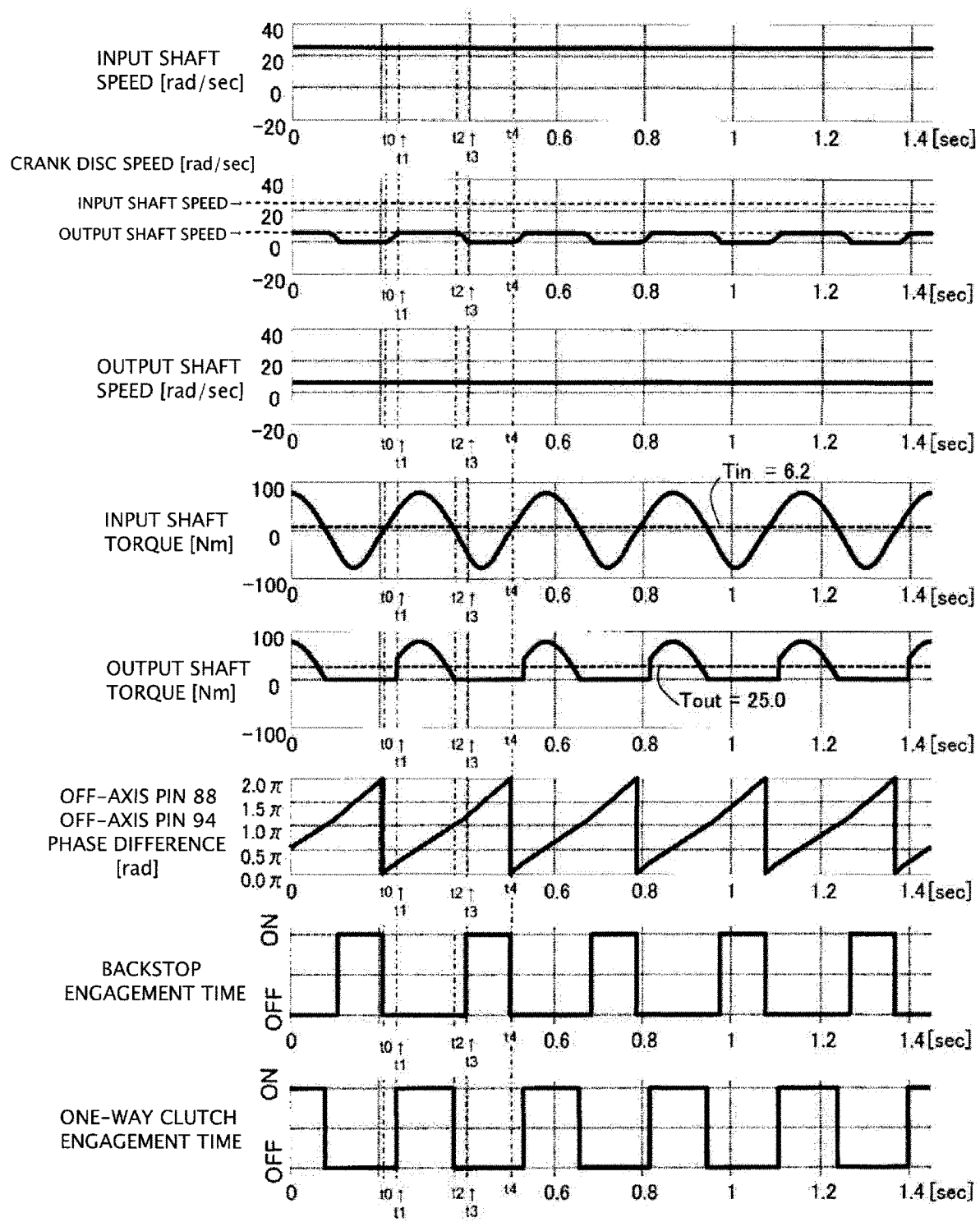
FIG. 24 is a drawing illustrating a timing chart (transmission gear ratio=0.25) of the drive force transmission device according to the third embodiment.

In FIG. 24, an example in which the transmission gear ratio between the input shaft 70 (first shaft) and the output shaft 74 (third shaft) is 0.25 (deceleration ratio 4.0) is shown. In the input shaft torque graph at this time, the average value of the input torque Tin=6.2 is shown. In the output side torque graph, the average value of the output torque Tout=25.0 is shown. As illustrated in the drawing, the torque is increased to approximately four times according to the transmission gear ratio of 0.25.

Figure 25:
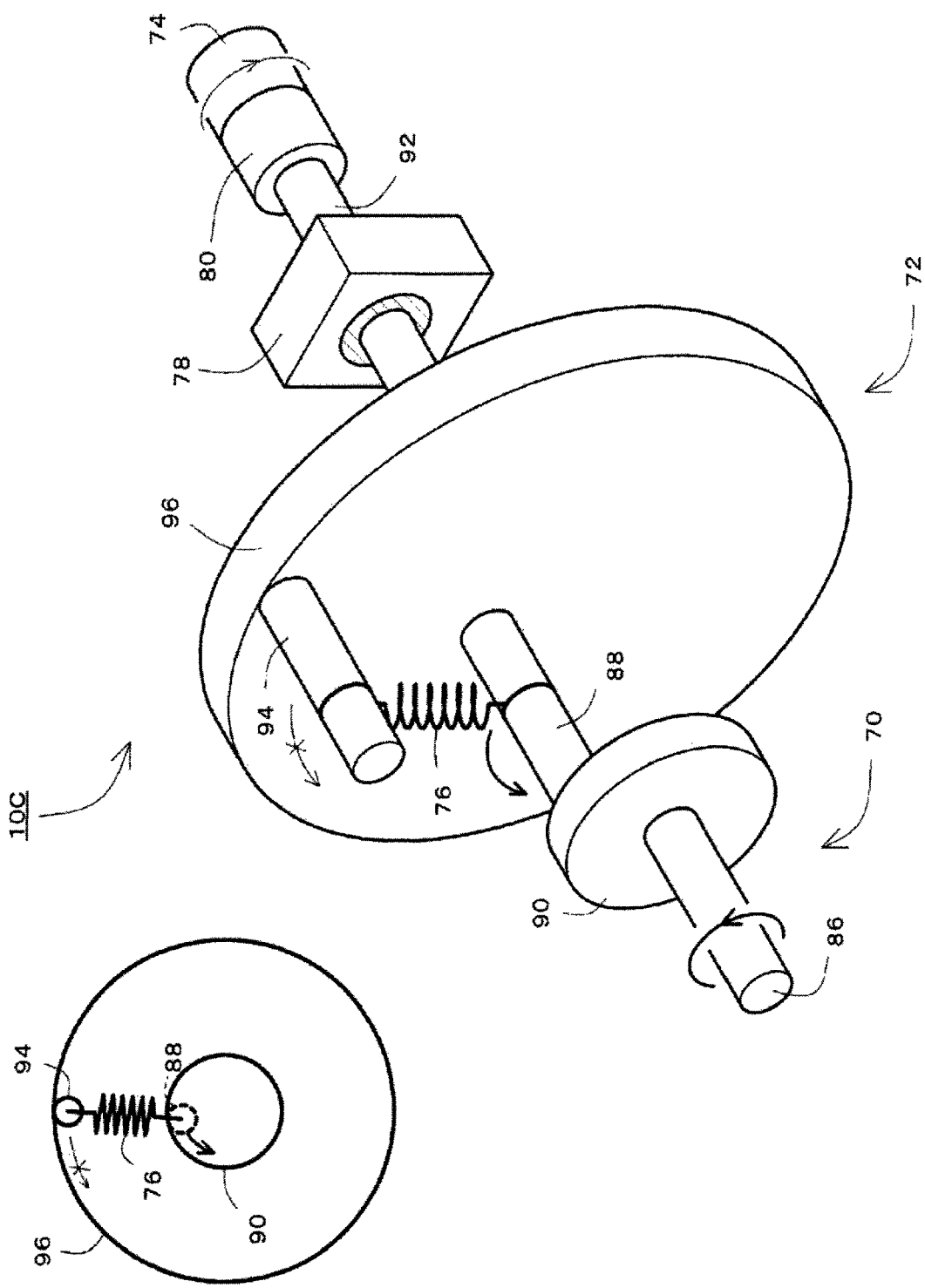
FIG. 25 is an explanatory drawing illustrating an action (reverse, off-axis pin phase difference=exceeding 0°) of the drive force transmission device according to the third embodiment.
Figure 26:
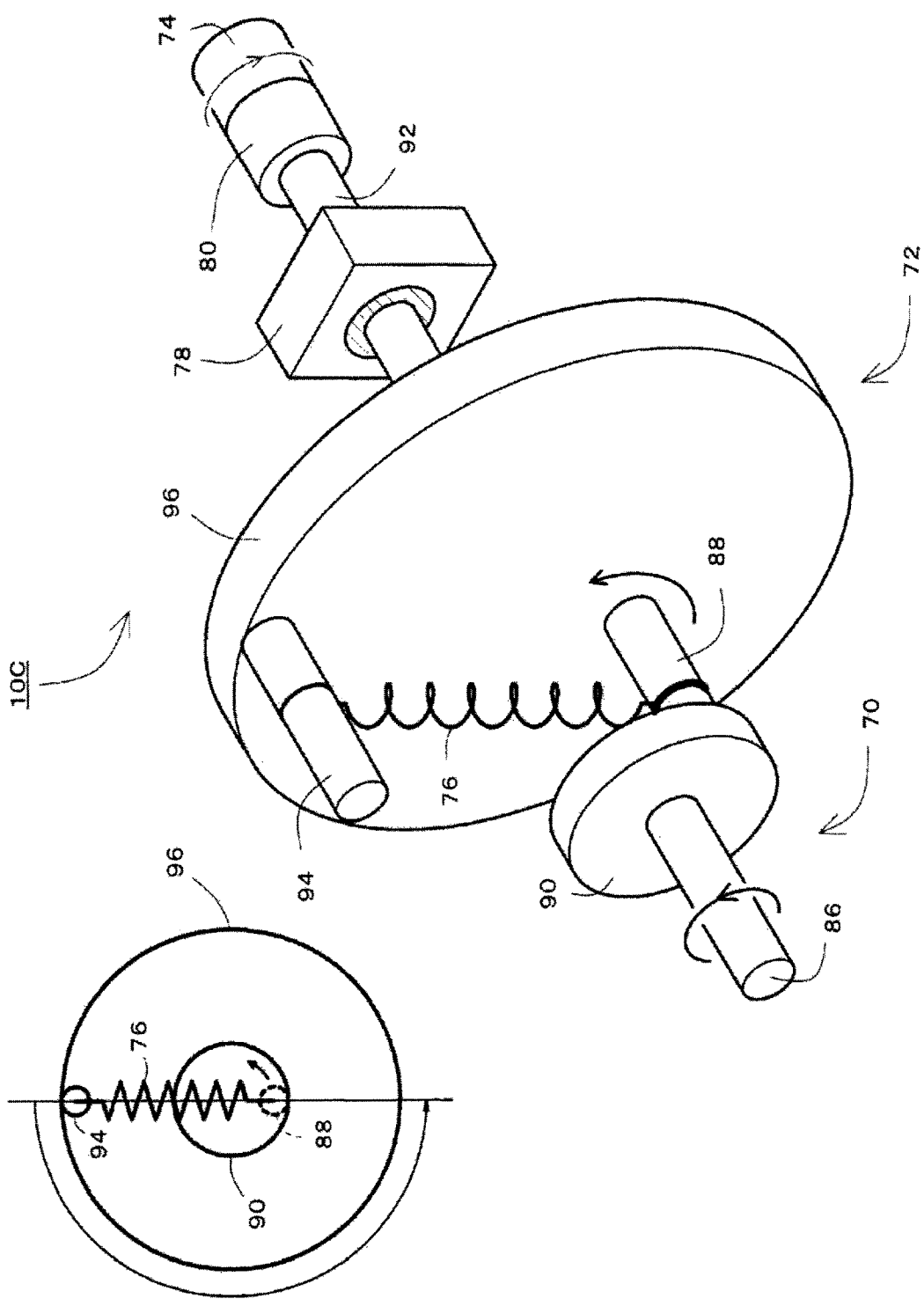
FIG. 26 is an explanatory drawing illustrating an action (reverse, off-axis pin phase difference=180°) of the drive force transmission device according to the third embodiment.
Figure 27:
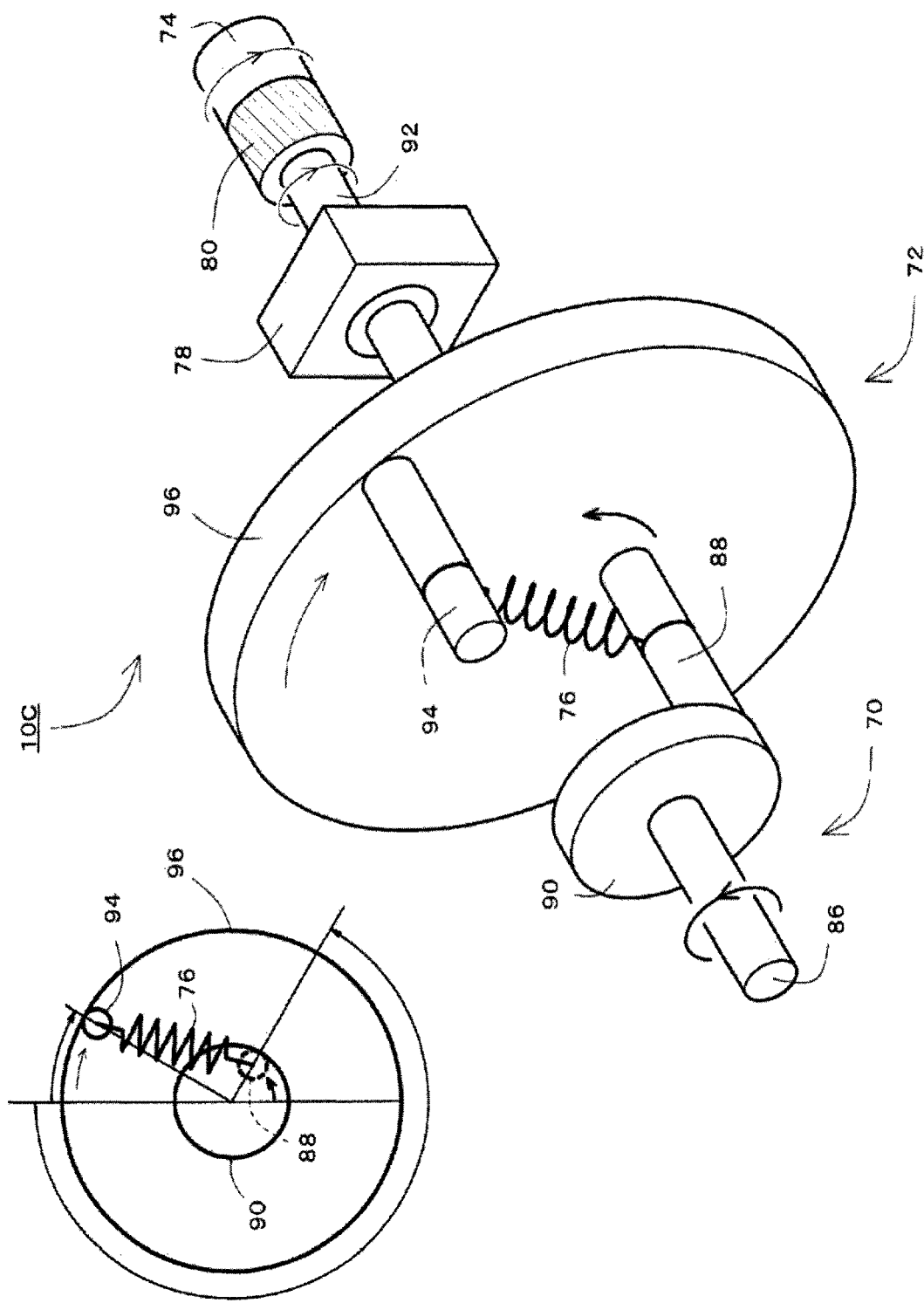
FIG. 27 is an explanatory drawing illustrating an action (reverse, off-axis pin phase difference=exceeding 180°) of the drive force transmission device according to the third embodiment.
Figure 28:
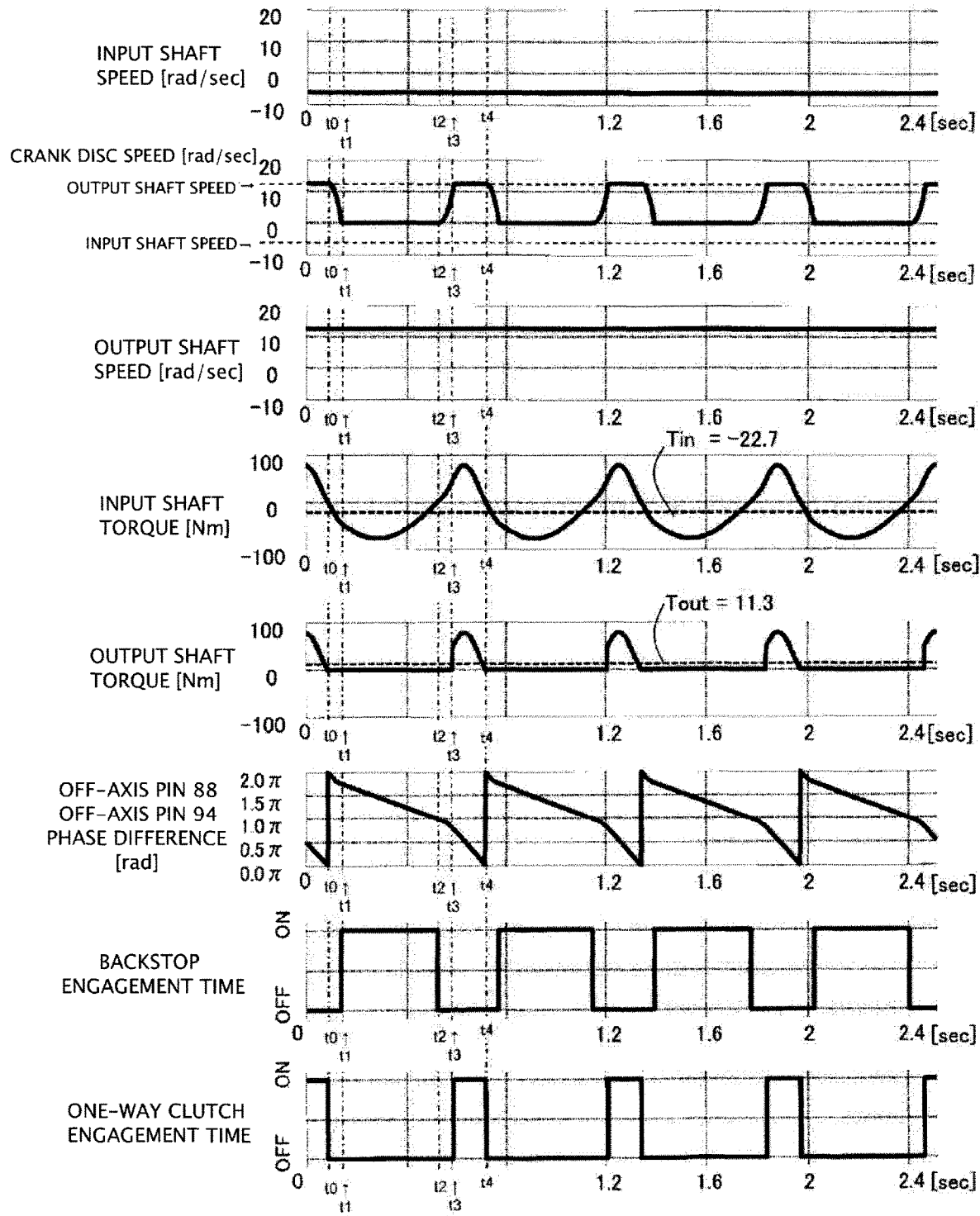
FIG. 28 is a drawing illustrating a timing chart (transmission gear ratio=−2.0) of the drive force transmission device according to the third embodiment.

FIG. 25 to FIG. 27 schematically illustrate reverse drive out of actions of the drive force transmission device 10C according to the embodiment (third embodiment). FIG. 28 illustrates a temporal change such as the speed change in association with the reverse drive. The order of the respective graphs in FIG. 28 is similar to FIG. 23.

As shown by the input shaft speed and the output shaft speed in FIG. 28, the rotary speed of the input shaft 70 (first shaft) is negative, and the rotary speed of the output shaft 74 (third shaft) is positive. The drive force transmission device 10C converts torque in a direction of reverse rotation (negative rotation) of the input shaft 70 into torque of a direction of normal rotation (positive rotation) of the output shaft 74.

At time t0 in FIG. 28, the phase difference between the off-axis pin 88 and the off-axis pin 94 may become 0. At this time, as will be described later, the one-way clutch 80 is switched from the engaged state (locked state) to the disengaged state. The backstop 78 is in the disengaged state. At this time, the elastic member 76 is expanded in the direction opposite to the direction of rotation of the output shaft 74 due to the difference in rotary speed between the off-axis pin 88 and the off-axis pin 94 of the input shaft 70.

In association with the expansion of the elastic member 76, the off-axis pin 94 and the crank disc 72 (second shaft) are pulled by the elastic member 76, and the off-axis pin 94 and the crank disc 72 are biased to rotate in a direction opposite from the direction of rotation of the output shaft 74. At this time, as illustrated at time t1 in FIG. 28 and FIG. 25, the backstop 78 is switched from the disengaged state to the engaged state. Consequently, the reverse rotation of the crank disc 72 is prevented (locked).

During a period in which the crank disc 72 is in the locked state, the input shaft 70 continues to rotate in the reverse direction, and consequently, the phase difference between the off-axis pin 88 and the off-axis pin 94 is increased, and elastic energy is accumulated in the elastic member 76. As illustrated at time t2 in FIG. 28 and in FIG. 26, the phase difference between the off-axis pin 88 and the off-axis pin 94 is 180°. At this time, the elastic member 76 is expanded to the maximum and reaches the uppermost point.

When the phase difference is 180° or more, as illustrated at times t2 to t3 in FIG. 28 and FIG. 27, the off-axis pin 94 is biased to rotate in the direction opposite from the direction of the input shaft 70, that is, in the normal direction of the output shaft 74 by the contraction (energy discharge) of the elastic member 76

At this time, the backstop 78 is switched from the engaged state to the disengaged state. In addition, when the speed of the crank disc 72 accelerated by the contraction of the elastic member 76 reaches the same speed as that of output shaft 74, the one-way clutch 80 is switched from the disengaged state to the engaged state as illustrated at time t3 in FIG. 28.

Consequently, the elastic energy of the elastic member 76 is transmitted to the output shaft 74 (the output shaft 74 is biased).

In addition, when the contraction of the elastic member 76 advances and the rotary speed of the crank disc 72 is reduced to that of the output shaft 74, the one-way clutch 80 is switched from the engaged state to the disengaged state as illustrated at time t4 in FIG. 28 or in the same manner as time t0. From then onward, the actions at times t1, t2, and t3 are performed in sequence.

Figure 29:
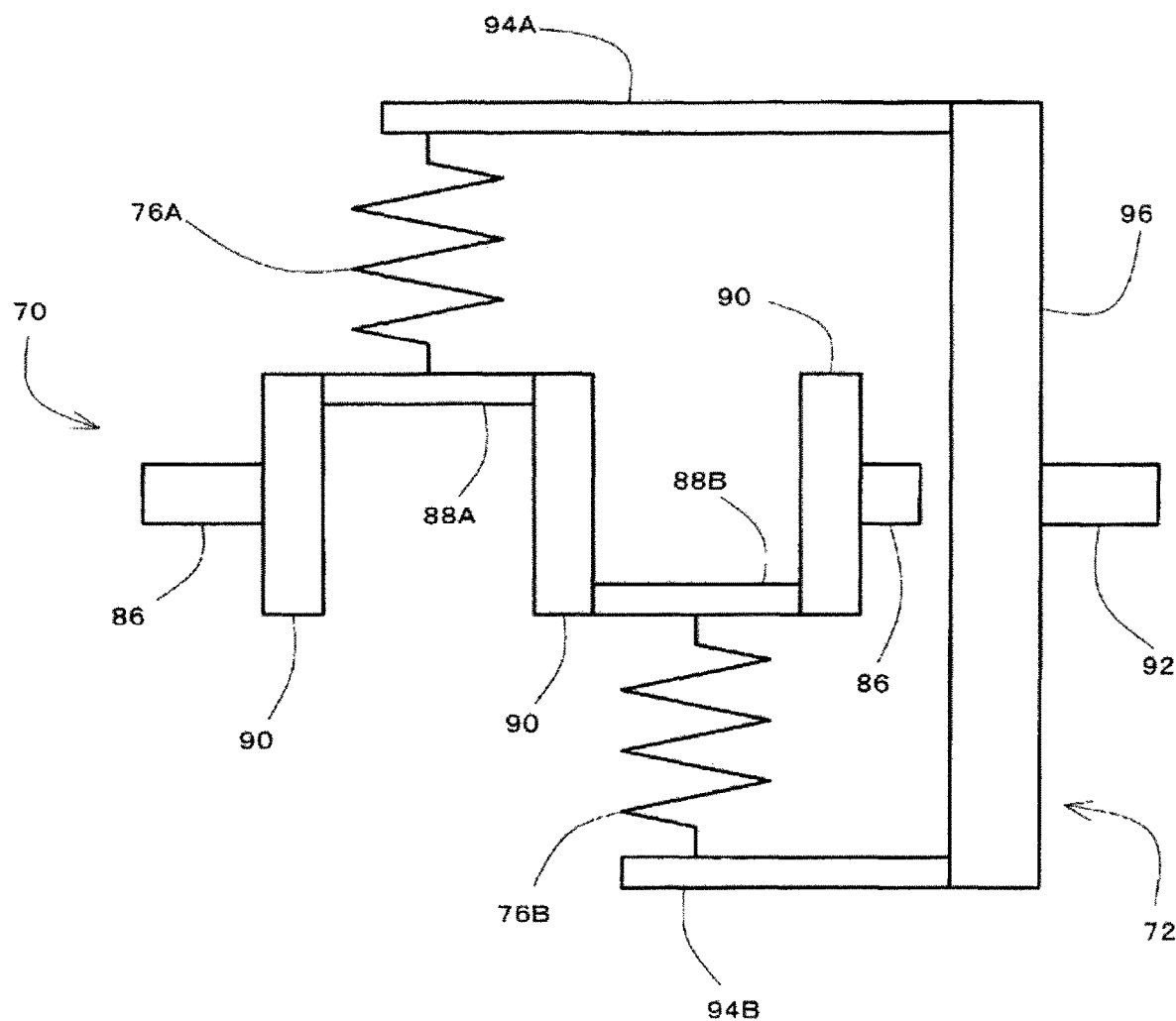
FIG. 29 is a drawing illustrating a modified drive force transmission device according to the third embodiment.

Note that the elastic member 76 may cause deflection in the input shaft 70 or the crank disc 72. Therefore, as illustrated in FIG. 29, the input shaft 70 may be replaced by the one that is a horizontal opposed type. In other words, the two off-axis pins 88A and 88B are provided so as to oppose each other and shift from each other by 180° with reference to the rotation phase of the input shaft 70. By slidably connecting the elastic members 76A and 76B respectively to the off-axis pins 88A and 88B as described above, the forces of the respective elastic members 76A and 76B that deflect the input shaft 70 cancel each other.

Although an example in which the input shaft 70 is modified into the horizontal opposed type is illustrated in FIG. 29, the crank disc 72 may be modified to the horizontal opposed type.

In addition, by disposing a plurality of the off-axis pins 88 on the disc plate 90 with a phase difference, and a plurality of the off-axis pins 94 on the disc plate 96 with a phase difference corresponding thereto, variation in transmission torque may be smoothed.

For example, in FIG. 23, a range that allows torque transmission is from 0.2π to π in phase difference between the off-axis pin 88 and the off-axis pin 94. By disposing the plurality of off-axis pins 88 (and the plurality of off-axis pins 94 corresponding thereto) taking into consideration the phase difference condition described above, variations in torque transmission may be smoothed.

Figure 30:
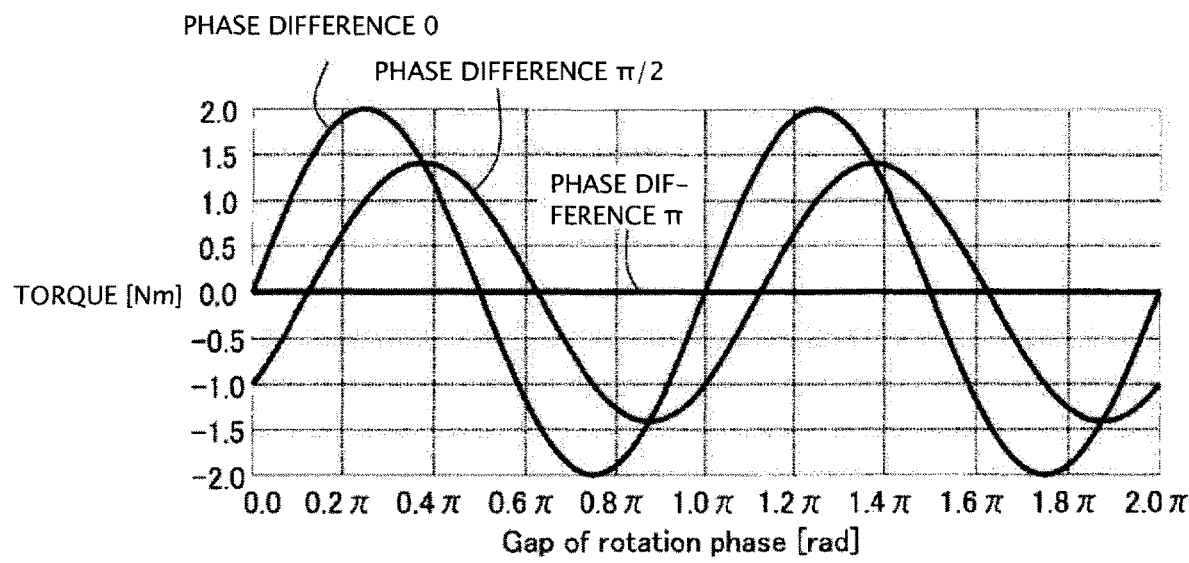
FIG. 30 is a graph for comparing a torque change in accordance with installation phase in a case where a plurality of elastic members are provided on the drive force transmission device according to the third embodiment.

FIG. 30 illustrates results of simulation in torque change in a case where the phase difference of the off-axis pins 88 on the disc plate 90 is 0, that is, the case where there is one off-axis pin 88, the case where the phase difference between two off-axis pins 88 on the disc plate 90 is π/2, and a case where a phase difference of two off-axis pins 88 on the disk plate 90 is π.

Fourth Embodiment

In the first to third embodiments, the elastic members 18 and 76 are employed as means for applying a force that varies with rotation of the crankshaft 14 and the crank disc 72 (second shaft). Instead, or in addition, however, a magnet may be used.

Figure 31:
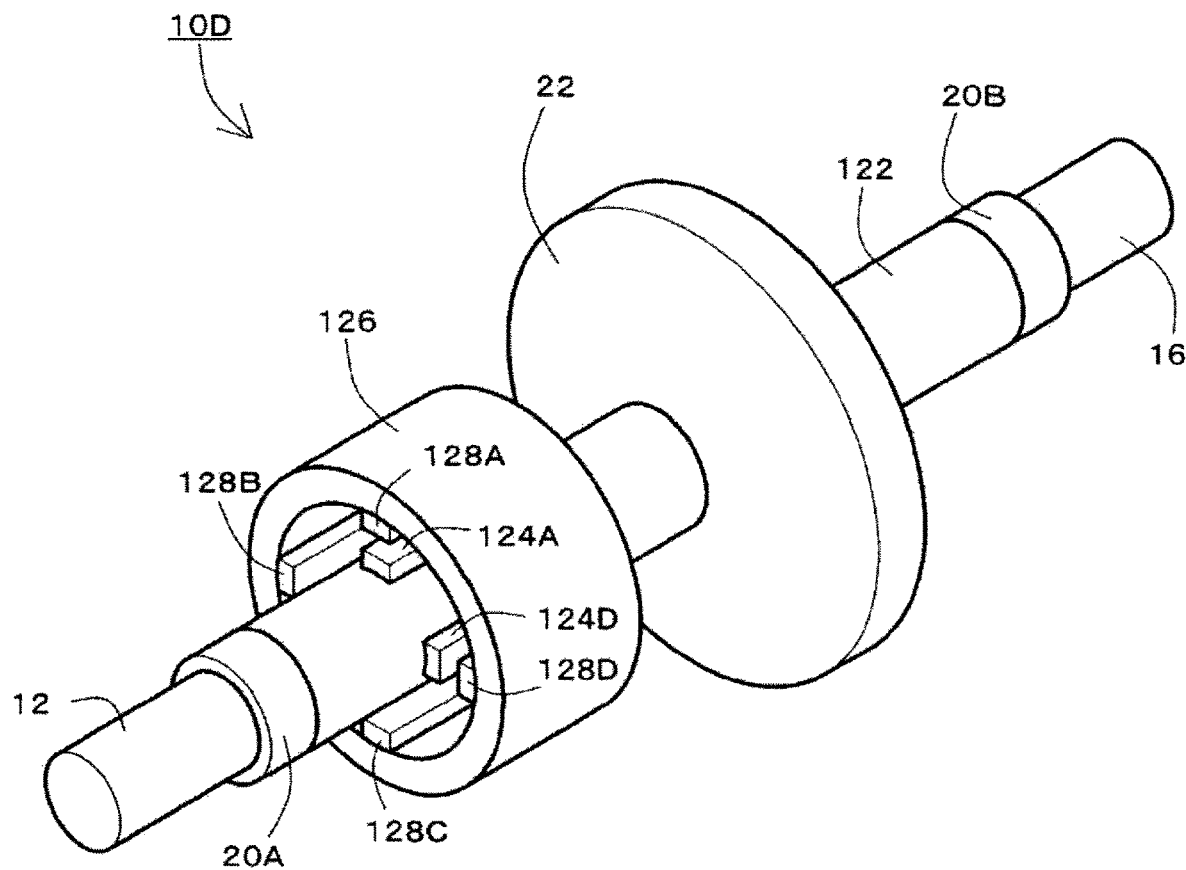
FIG. 31 is a drawing illustrating a modified drive force transmission device according to the fourth embodiment.

FIG. 31 illustrates a drive force transmission device 10D according to a fourth embodiment as a modification of the drive force transmission device 10B illustrated in FIG. 8 (second embodiment). A difference between the drive force transmission device 10B and the drive force transmission device 10D is that an intermediate shaft 122 (second shaft) is provided instead of the crankshaft 14. In addition, the shaft-side magnet 124 is provided on an outer peripheral surface of the intermediate shaft 122. In addition, a cylindrical shaped fixed member 126 is provided at a distance from the shaft-side magnet 124 in the radial direction and the fixed-side magnet 128 is provided on an inner peripheral surface.

The input shaft 12, the intermediate shaft 122, and the output shaft 16 are disposed coaxially. The input shaft 12 and the intermediate shaft 122 are connected via the input-side one-way clutch 20A, and the intermediate shaft 122 and the output shaft 16 are connected via the output-side one-way clutch 20B.

Figure 32:
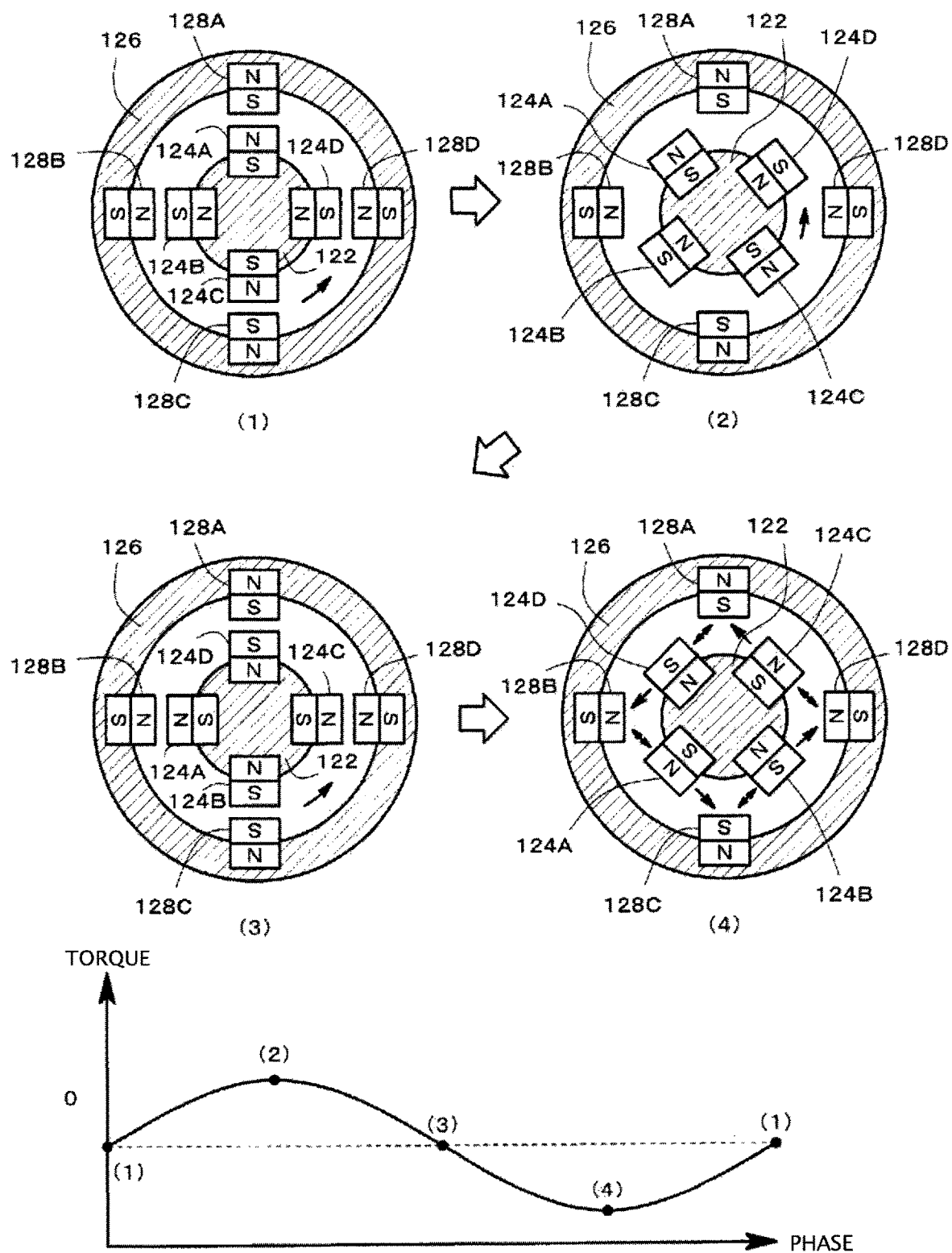
FIG. 32 is an explanatory drawing illustrating actions of a modified drive force transmission device according to the fourth embodiment.

FIG. 32 illustrates an example of actions of the drive force transmission device 10D. The lower part of FIG. 32 illustrates a variation of torque applied from the input shaft 12 to the intermediate shaft 122. As illustrated in FIG. 32, the shaft-side magnet 124 includes magnetic poles exposed toward the fixed member 126 disposed so as to be reversed alternately along the circumferential direction. In the same manner, the fixed-side magnet 128 includes magnetic poles exposed toward the intermediate shaft 122 disposed so as to be reversed alternately along the circumferential direction.

As illustrated in an action (1) in FIG. 32, a plurality of shaft-side magnets 124A to 124D and a plurality of fixed-side magnets 128A to 128D are attracted to each other. At this time, the input-side one-way clutch 20A is in the engaged state, and the intermediate shaft 122 is biased to rotate by the input shaft 12.

Subsequently, as illustrated in an action (2) in FIG. 32, the plurality of shaft-side magnets 124A to 124D are shifted from the plurality of fixed-side magnets 128A to 128D in phase in association with the rotation of the intermediate shaft 122. At this time, the intermediate shaft 122 is biased to rotate by the input shaft 12 against repulsion between the shaft-side magnet 124A and the fixed-side magnet 128B, between the shaft-side magnet 124B and the fixed-side magnet 128C, between the shaft-side magnet 124C and the fixed-side magnet 128D, and between the shaft-side magnet 124D and the fixed-side magnet 128A.

Subsequently, as illustrated in an action (3) in FIG. 32, the shaft-side magnets 124A to 124D and the fixed-side magnets 128A to 128D are opposed and repulsive to each other.

In addition, as illustrated in an action (4) in FIG. 32, the shaft-side magnet 124A is repulsive to the fixed-side magnet 128B, and the shaft-side magnet 124A and the fixed-side magnet 128C attract each other in association with the rotation of the intermediate shaft 122. In the same manner, the shaft-side magnet 124B is repulsive to the fixed-side magnet 128C, and the shaft-side magnet 124B and the fixed-side magnet 128D attract each other. The shaft-side magnet 124C is repulsive to the fixed-side magnet 128D, and the shaft-side magnet 124C and the fixed-side magnet 128A attract each other. The shaft-side magnet 124D is repulsive to the fixed-side magnet 128A, and the shaft-side magnet 124D and the fixed-side magnet 128B attract each other.

At this time, the intermediate shaft 122 is rotated by repulsion and attraction between the shaft-side magnets 124A to 124D and the fixed-side magnets 128A to 128D (energy discharge). Subsequently, the procedure returns to an action (1) in FIG. 32, and actions from (2) to (4) are repeated.

In FIG. 31, the magnet is used instead of the elastic member 18 as a modification of the second embodiment (FIG. 8). However, a magnet may be used instead of the elastic member 76 as a modification of the third embodiment (FIG. 16). Specifically, a magnet is disposed on an outer peripheral surface of the off-axis pin 88 of the input shaft 70 (first shaft), and a magnet is also disposed on an outer peripheral surface of the off-axis pin 94 of the crank disc (second shaft). With repulsion and attraction of these magnets, the crank disc 72 is biased to rotate.

In addition, an electromagnet that allows adjustment of magnetic force may also be used as the magnet of this embodiment instead of using permanent magnets. In this case, the transmission gear ratio calculation units 60 and 116 (demand value acquiring unit) of the control apparatuses 26 and 84 calculate the transmission gear ratio (demand value) of the output shafts 16 and 74 (third shaft) with respect to the input shafts 12 and 70 (first shaft). The transmission gear ratio is sent to the magnetic force calculating unit, not illustrated, where a magnetic force increase/decrease amount is calculated. Based on the calculated magnetic force increase/decrease amount, the magnetic forces of the shaft-side magnets 124A to 124D and the plurality of fixed-side magnets 128A to 128D are increased or decreased by a control unit, which is not illustrated.

The disclosure is not limited to the embodiments described above, and any modifications and corrections are included without departing from the technical scope and gist of the disclosure specified in the Claims.

The invention claimed is:

1. A drive force transmission device comprising:
a first shaft that is configured to rotate;
a crankshaft that is also configured to rotate, a main journal of the crankshaft being coaxially connected to the first shaft;
an elastic member that is connected at one end thereof to a circumference of the crankshaft, the one end of the elastic member being slidably connected to a crank pin of the crankshaft;
a fixed member that is arranged separately from the first shaft and the crankshaft; and
a processor programmed to acquire a demand value, wherein the processor controls a range of a force applied to the crankshaft based on the demand value acquired by the processor,
wherein:
the elastic member is fixed at the other end thereof to the fixed member,
the crankshaft is applied with the force in a predetermined direction of rotation or in a direction opposite to the direction of rotation via the elastic member,
the force varies in strength in association with the rotation, and
the first shaft is configured to receive a drive force and apply the drive force to the crankshaft so as to rotate the crankshaft.

2. The drive force transmission device according to claim 1, wherein
the first shaft and the crankshaft are connected via a first one-way clutch, and
the first one-way clutch enters an engaged state when a rotary speed of the crankshaft is equal to or lower than a rotary speed of the first shaft, and enters a disengaged state when the rotary speed of the crankshaft is higher than the rotary speed of the first shaft.

3. The drive force transmission device according to claim 2, further comprising:
a third shaft connected to the crankshaft,
wherein the third shaft is connected to the crankshaft via a second one-way clutch, and
the second one-way clutch enters the disengaged state when the rotary speed of the crankshaft is lower than a rotary speed of the third shaft, and enters the engaged state when the rotary speed of the crankshaft is equal to or higher than the rotary speed of the third shaft.

4. The drive force transmission device according to claim 3, wherein
the rotary speed of the first shaft is lower than the rotary speed of the third shaft.

5. The drive force transmission device according to claim 4, wherein
the crankshaft is rotated in association with the rotation of the first shaft by the first one-way clutch entering the engaged state when the rotary speed of the crankshaft is equal to or lower than the rotary speed of the first shaft, and the elastic member is expanded in association with the rotation of the crankshaft thereby accumulating elastic energy, and
when the crank pin rotates further from an uppermost point where the fixed member and the crank pin are at positions farthest from each other and the elastic member is expanded to the maximum, the crankshaft is rotated in association with contraction of the elastic member, and when the rotary speed of the crankshaft in association with the contraction exceeds the rotary speed of the first shaft, the first one-way clutch is switched from the engaged state to the disengaged state, and
when the rotary speed of the crankshaft in association with the contraction of the elastic member reaches a speed equal to the rotary speed of the third shaft, the second one-way clutch enters the engaged state and the third shaft is biased.

6. The drive force transmission device according to claim 5, wherein
the processor is programmed to control spring displacement of the elastic member based on the demand value acquired by the processor.

7. The drive force transmission device according to claim 6, further comprising:
a movable mechanism that is capable of changing a relative distance between the fixed member and the crank pin, and
the processor is programmed to control driving of the movable mechanism based on the demand value, which corresponds to a transmission gear ratio of the third shaft with respect to the first shaft acquired by the processor.

* * * * *